(12) United States Patent
Yamamoto et al.

(10) Patent No.: US 11,772,412 B2
(45) Date of Patent: Oct. 3, 2023

(54) LAYER TRANSFER DEVICE

(71) Applicant: BROTHER KOGYO KABUSHIKI KAISHA, Nagoya (JP)

(72) Inventors: Tomoya Yamamoto, Aichi (JP); Takashi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 236 days.

(21) Appl. No.: 17/382,767

(22) Filed: Jul. 22, 2021

(65) Prior Publication Data

US 2021/0347198 A1 Nov. 11, 2021

Related U.S. Application Data

(63) Continuation of application No. PCT/JP2019/020645, filed on May 24, 2019.

(30) Foreign Application Priority Data

Jan. 29, 2019 (JP) ................................. 2019-012736
Jan. 30, 2019 (JP) ................................. 2019-014415

(Continued)

(51) Int. Cl.
*B44C 1/17* (2006.01)
*B41F 16/00* (2006.01)
(Continued)

(52) U.S. Cl.
CPC ............ *B44C 1/17* (2013.01); *B32B 37/0053* (2013.01); *B32B 38/004* (2013.01); *B41F 16/00* (2013.01);
(Continued)

(58) Field of Classification Search
CPC ............ B32B 37/0053; B32B 37/0025; B32B 2037/0061; B32B 38/1825; B32B 41/00
See application file for complete search history.

(56) References Cited

U.S. PATENT DOCUMENTS 5,179,415 A * 1/1993 Ikematsu ........... G03G 15/2035
399/331
6,431,244 B1 * 8/2002 Moriguchi ............ B32B 37/226
156/582

(Continued)

FOREIGN PATENT DOCUMENTS

JP 60-104370 A 6/1985
JP 4-68382 A 3/1992

(Continued)

OTHER PUBLICATIONS

International Preliminary Report on Patentability and Written Opinion of the International Searching Authority issued in corresponding International Patent Application No. PCT/JP2019/020645, dated Jul. 27, 2021.

(Continued)

*Primary Examiner* — Francisco W Tschen
*Assistant Examiner* — Abhishek A Patwardhan
(74) *Attorney, Agent, or Firm* — Merchant & Gould P.C.

(57) ABSTRACT

A layer transfer device includes a supply reel, a take-up reel, a driving source, a releasable restraining device, a heating roller, a pressure roller, and a controller. The driving source drives the take-up reel. The releasable restraining device is capable of switching to a restraining state in which a multilayer film is put under restraint in being drawn out from the supply reel and to a release state in which the restraint is lifted. The controller is configured such that when the driving source is generating the mechanical power, the releasable restraining device is in the restraining state if an image area in which an image is formed on the sheet is not (Continued)

present in a layer transfer position between the heating roller and the pressure roller, and the releasable restraining device is in the release state if the image area is present in the layer transfer position.

38 Claims, 22 Drawing Sheets

(30) Foreign Application Priority Data

Jan. 30, 2019 (JP) .................................. 2019-014419
Jan. 31, 2019 (JP) .................................. 2019-015452

(51) Int. Cl.
 *G03G 15/20* (2006.01)
 *B32B 37/00* (2006.01)
 *B32B 38/00* (2006.01)

(52) U.S. Cl.
 CPC ..... *G03G 15/2032* (2013.01); *G03G 15/2064* (2013.01); *B32B 2037/0061* (2013.01)

(56) References Cited

U.S. PATENT DOCUMENTS

| | | | | |
|---|---|---|---|---|
| 7,979,000 | B2 * | 7/2011 | Sekina | G03G 21/168 |
| | | | | 399/121 |
| 2006/0239715 | A1 * | 10/2006 | Lee | G03G 15/2035 |
| | | | | 399/122 |
| 2019/0094767 | A1 * | 3/2019 | Sakai | G03G 15/2042 |

FOREIGN PATENT DOCUMENTS

| | | | |
|---|---|---|---|
| JP | 5-202656 | A | 8/1993 |
| JP | 6-188589 | A | 7/1994 |
| JP | 7-140820 | A | 6/1995 |
| JP | 7-290685 | A | 11/1995 |
| JP | 11-15326 | A | 1/1999 |
| JP | 2002-120960 | A | 4/2002 |
| JP | 2007-216395 | A | 8/2007 |
| JP | 2013-91235 | A | 5/2013 |
| JP | 2018-93599 | A | 6/2018 |

OTHER PUBLICATIONS

International Search Report issued in corresponding International Patent Application No. PCT/JP2019/020645, dated Aug. 20, 2019.

* cited by examiner

PRE-TRANSFER PROCESS IN ENTIRE AREA TRANSFER MODE

POST-TRANSFER PROCESS IN ENTIRE AREA TRANSFER MODE

POST-TRANSFER PROCESS IN FORWARD AREA TRANSFER MODE

PRE-TRANSFER PROCESS IN REARWARD AREA TRANSFER MODE

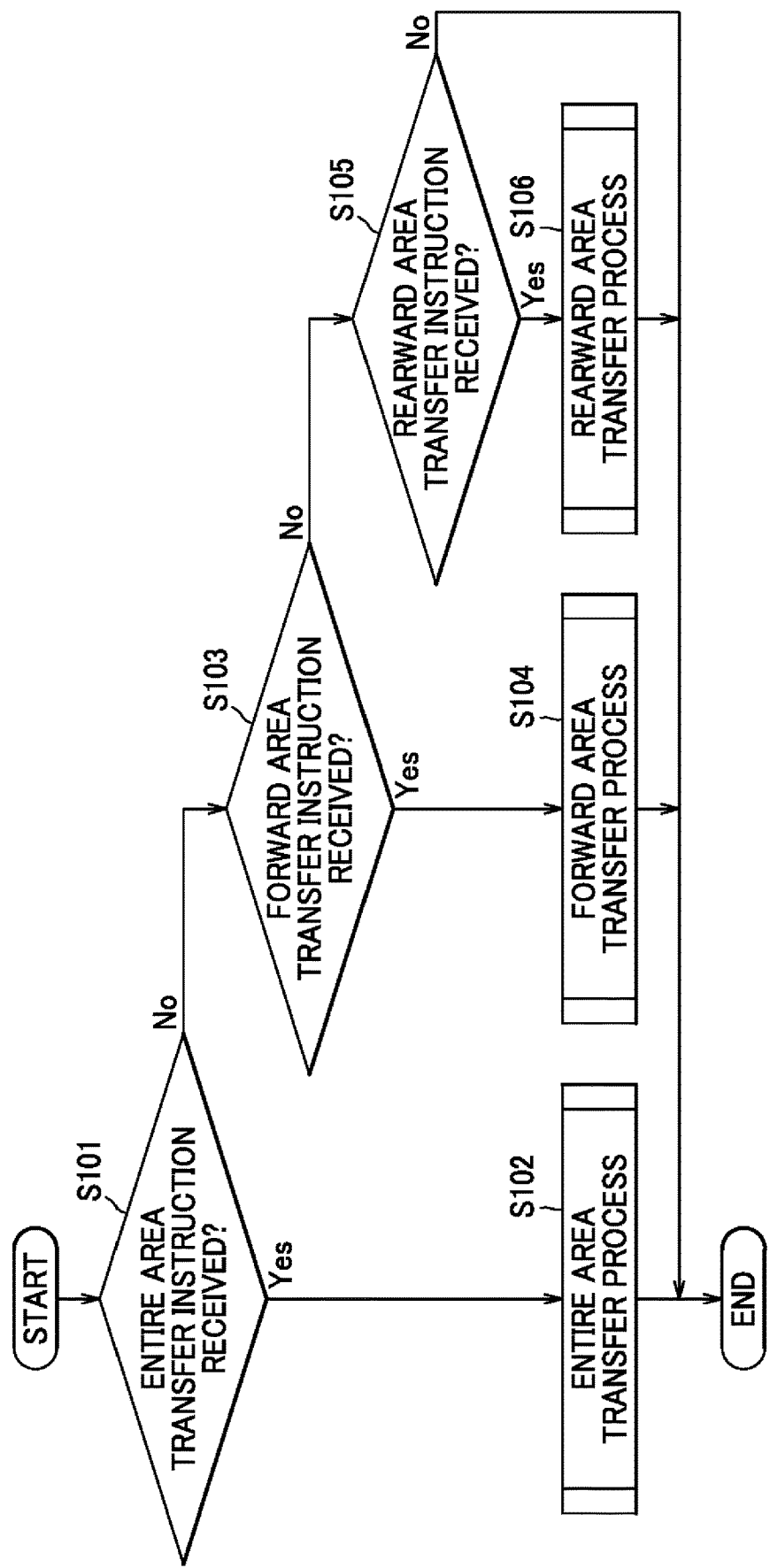

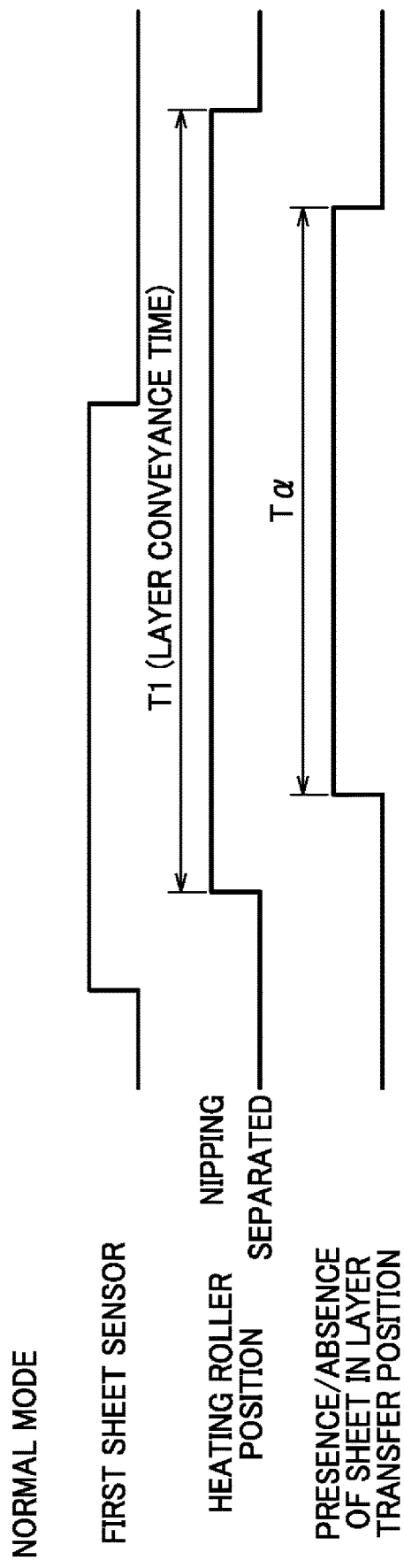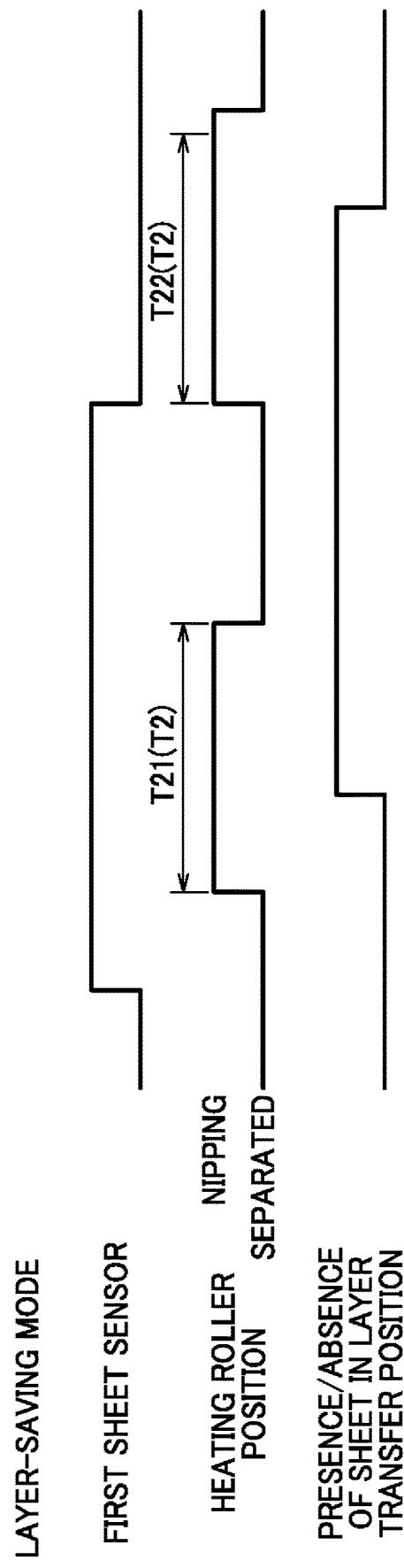

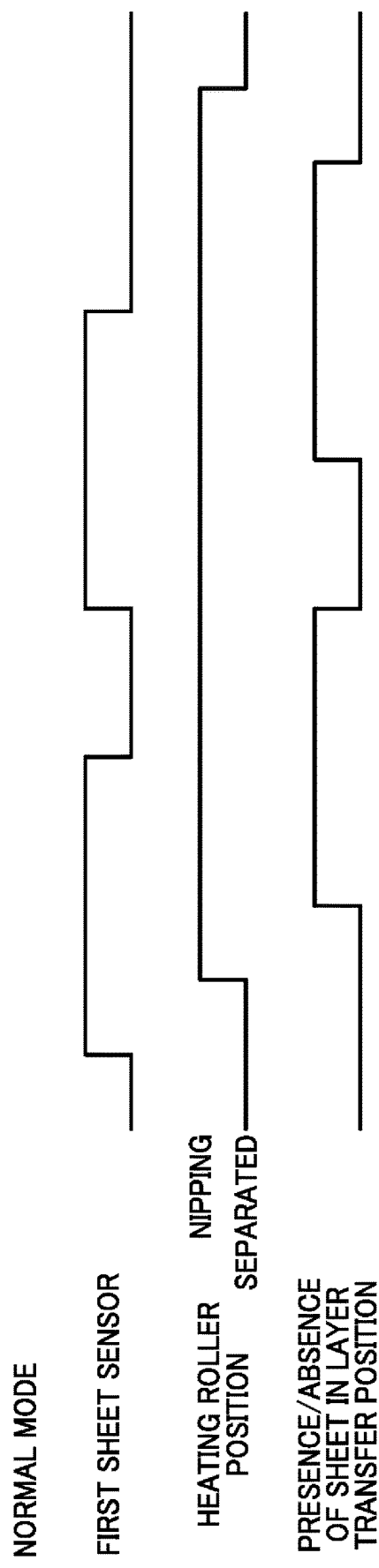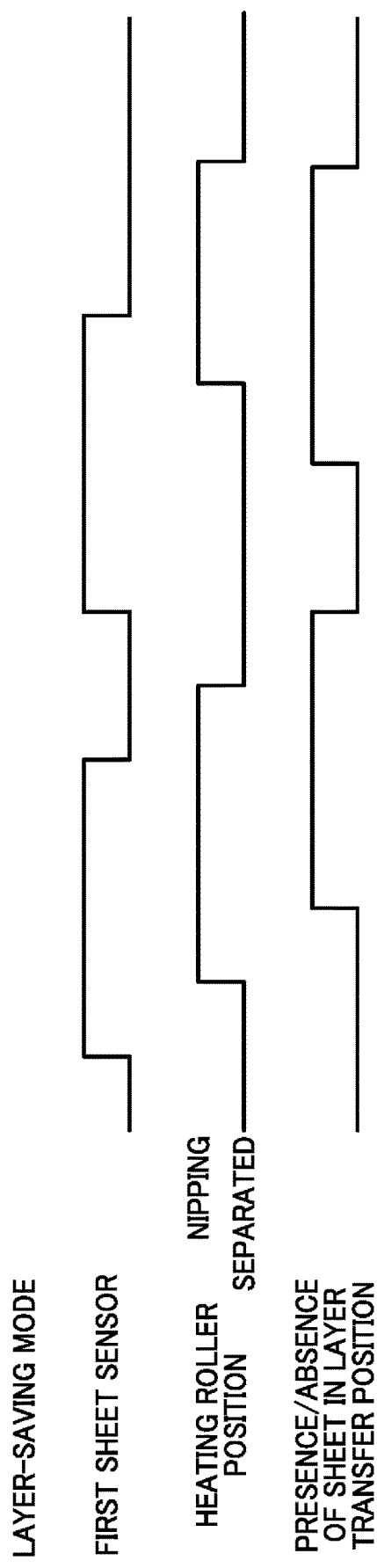

LAYER TRANSFER DEVICE

CROSS-REFERENCE TO RELATED APPLICATION(S)

This application is a continuation of International Application No. PCT/JP2019/020645 filed on May 24, 2019, which claims priority from Japanese Patent Applications No. 2019-012736 filed on Jan. 29, 2019, No. 2019-014415 filed Jan. 30, 2019, No. 2019-014419 filed on Jan. 30, 2019, and No. 2019-015452 filed on Jan. 31, 2019, the disclosures of which are incorporated herein by reference in their entirety.

TECHNICAL FIELD

This disclosure relates to a layer transfer device for transferring a transfer layer onto an image formed on a sheet.

BACKGROUND ART

A layer transfer device including a supply reel, a take-up reel, a heating roller, and a pressure roller is known in the art. A multilayer film having a transfer layer included therein is wound on the supply reel. A sheet on which an image is formed is fed and laid on the multilayer film supplied from the supply reel; then, the sheet and the multilayer film are nipped between the heating roller and the pressure roller which are being rotated, and are heated by the heating roller while being conveyed through between the heating roller and the pressure roller, so that the transfer layer is transferred onto the image formed on the sheet. The multilayer film after subjected to this transfer process is taken up on the take-up reel.

SUMMARY

In this technical scheme, for example, if starting of rotation of the heating roller and the pressure roller after receiving a layer transfer instruction is timed before starting conveyance of a sheet, the multilayer film uselessly conveyed and taken up would disadvantageously run to waste. It would be desirable to reduce waste of the multilayer film.

In one aspect, a layer transfer device for transferring a transfer layer onto an image formed on a sheet is disclosed herein. The layer transfer device includes a supply reel, a take-up reel, a driving source, a releasable restraining device, a heating roller, a pressure roller, and a controller. A multilayer film including a transfer layer and a supporting layer supporting the transfer layer is wound on the supply reel, and to be taken up on the take-up reel. The driving source is configured to generate mechanical power to drive the take-up reel.

The releasable restraining device is capable of switching to a restraining state in which the multilayer film is put under restraint in being drawn out from the supply reel and to a release state in which the restraint is lifted. The heating roller is configured to heat the multilayer film and the sheet. The pressure roller is configured to be rotatable to convey the multilayer film and the sheet nipped between the pressure roller and the heating roller. The controller is configured such that when the driving source is generating the mechanical power, the releasable restraining device is in the restraining state if an image area in which the image is formed on the sheet is not present in a layer transfer position between the heating roller and the pressure roller, and the releasable restraining device is in the release state if the image area is present in the layer transfer position.

BRIEF DESCRIPTION OF THE DRAWINGS

The above and other aspects, their advantages and further features will become more apparent by describing in detail illustrative, non-limiting embodiments thereof with reference to the accompanying drawings, in which:

FIG. 8 is a flowchart showing a process of operation of a controller;

FIG. 17A is a timing chart showing timings of sequential operations of relevant components as timed for a layer transfer process executed on a single sheet in a normal mode;

FIG. 17B is a timing chart showing timings of sequential operations of relevant components as timed for a layer transfer process executed on a single sheet in a layer-saving mode;

FIG. 18A is a timing chart showing timings of sequential operations of relevant components as timed for a layer transfer process executed on a plurality of sheets to be conveyed successively in the normal mode;

FIG. 18B is a timing chart showing timings of sequential operations of relevant components as timed for a layer transfer process executed on a plurality of sheets to be conveyed successively in the layer-saving mode;

DESCRIPTION OF EMBODIMENTS

A description will be given of one embodiment with reference made to the drawings where appropriate. In the following description, a general setup of a layer transfer device will be briefly described at the outset, and specific configurations and features will be described thereafter.

Figure 1A:
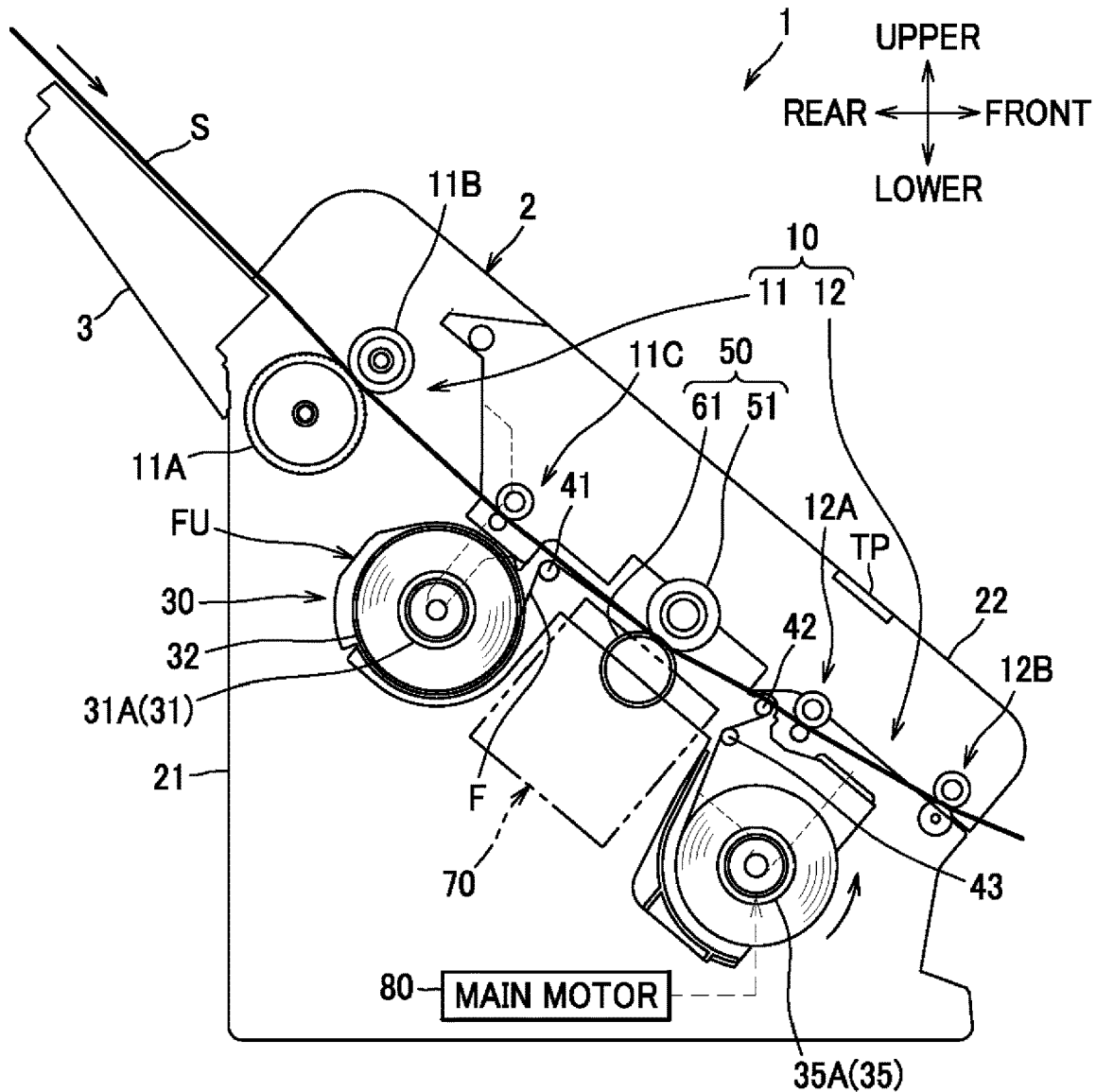
FIG. 1A is a diagram showing a layer transfer device according to one embodiment.

In the following description, directions will be referred to as directions shown in FIG. 1A. That is, the right-hand side of FIG. 1A is referred to as "front", the left-hand side of FIG. 1A as "rear", the front side of the drawing sheet of FIG. 1A as "left", and the back side of the drawing sheet of FIG. 1A as "right". Similarly, upward/downward directions (upper/lower sides) of FIG. 1A are referred to as "upward/downward (upper/lower)".

As shown in FIG. 1A, a layer transfer device 1 is a device for post-processing to be subjected to a sheet S on which an image is formed (e.g., printed in ink) by an image forming apparatus, for example, a toner image is formed by a laser printer; more specifically, a device for transferring foil such as of aluminum or the like onto the toner image on the sheet S. The layer transfer device 1 thus forms a foil image on the sheet S by transferring foil onto the toner image on the sheet S. The layer transfer device 1 includes a housing 2, a sheet tray 3, a sheet conveyor unit 10, a film supply unit 30, and a transfer unit 50. The sheet conveyor unit 10 is an example of a sheet conveyor mechanism.

The housing 2 is made of plastic or the like, and includes a housing main body 21 and a cover 22. The housing main body 21 has an opening 21A at its upper side (see FIG. 2). The opening 21A is an opening through which to cause a film unit FU as will be described later to be installed into or removed from the housing main body 21. The cover 22 is a member for opening and closing the opening 21A. A rear end portion of the cover 22 is rotatably supported by the housing main body 21. The cover 22 is configured to be rotatable between a closed position in which the opening 21A is closed (position in FIG. 1A) and an open position in which the opening 21A is open (position in FIG. 2).

The sheet tray 3 is a tray on which sheets S such as paper, OHP film, etc., are placed. The sheet tray 3 is provided at a rear portion of the housing 2. The sheets S, with surfaces thereof having toner images formed thereon facing downward, are placed on the sheet tray 3.

The sheet conveyor unit 10 includes a sheet feed mechanism 11 and a sheet ejection mechanism 12. The sheet feed mechanism 11 is a mechanism that conveys sheets S on the sheet tray 3 one by one toward the transfer unit 50. The sheet feed mechanism 11 includes a pickup roller 11A, a retard roller 11B, and an upstream conveyor roller 11C. The upstream conveyor roller 11C is an example of an upstream conveyor member.

The pickup roller 11A is a roller that feeds a sheet S on the sheet tray 3 toward the transfer unit 50. The retard roller 11B is a roller that separates, from other sheets S on the sheet tray 3, one sheet S to be conveyed by the pickup roller 11A.

The retard roller 11B is located above the pickup roller 11A. The retard roller 11B is configured to be rotatable in such a direction that the sheets S stacked on the sheet S to be fed forward by the pickup roller 11A are moved back to the sheet tray 3.

The upstream conveyor roller 11C includes two rollers. A sheet S nipped between the two rollers of the upstream conveyor roller 11C can be conveyed as the rollers rotate. The upstream conveyor roller 11C is located between the pickup roller 11A and the transfer unit 50, and configured to convey a sheet S fed by the pickup roller 11A to the transfer unit 50.

The sheet ejection mechanism 12 is a mechanism that ejects a sheet S which has passed through the transfer unit 50, to the outside of the housing 2. The sheet ejection mechanism 12 includes a downstream conveyor roller 12A and an ejection roller 12B. The downstream conveyor roller 12A is an example of a downstream conveyor member.

Each of the downstream conveyor roller 12A and the ejection roller 12B includes two rollers. A sheet S nipped between the two rollers of each of the downstream conveyor roller 12A and the ejection roller 12B can be conveyed as the rollers rotate. The downstream conveyor roller 12A is located between the transfer unit 50 and the ejection roller 12B, and configured to convey a sheet S received from the transfer unit 50 to the ejection roller 12B. The ejection roller 12B is located downstream of the downstream conveyor roller 12A in a direction of conveyance of the sheet S, and configured to eject a sheet S forwarded by the downstream conveyor roller 12A to the outside of the housing 2.

The film supply unit 30 is a unit that supplies and lays a multilayer film F onto a sheet S conveyed from the sheet feed mechanism 11. The film supply unit 30 includes a film unit FU, and a main motor 80. The main motor 80 is an example of a driving source.

Figure 2:
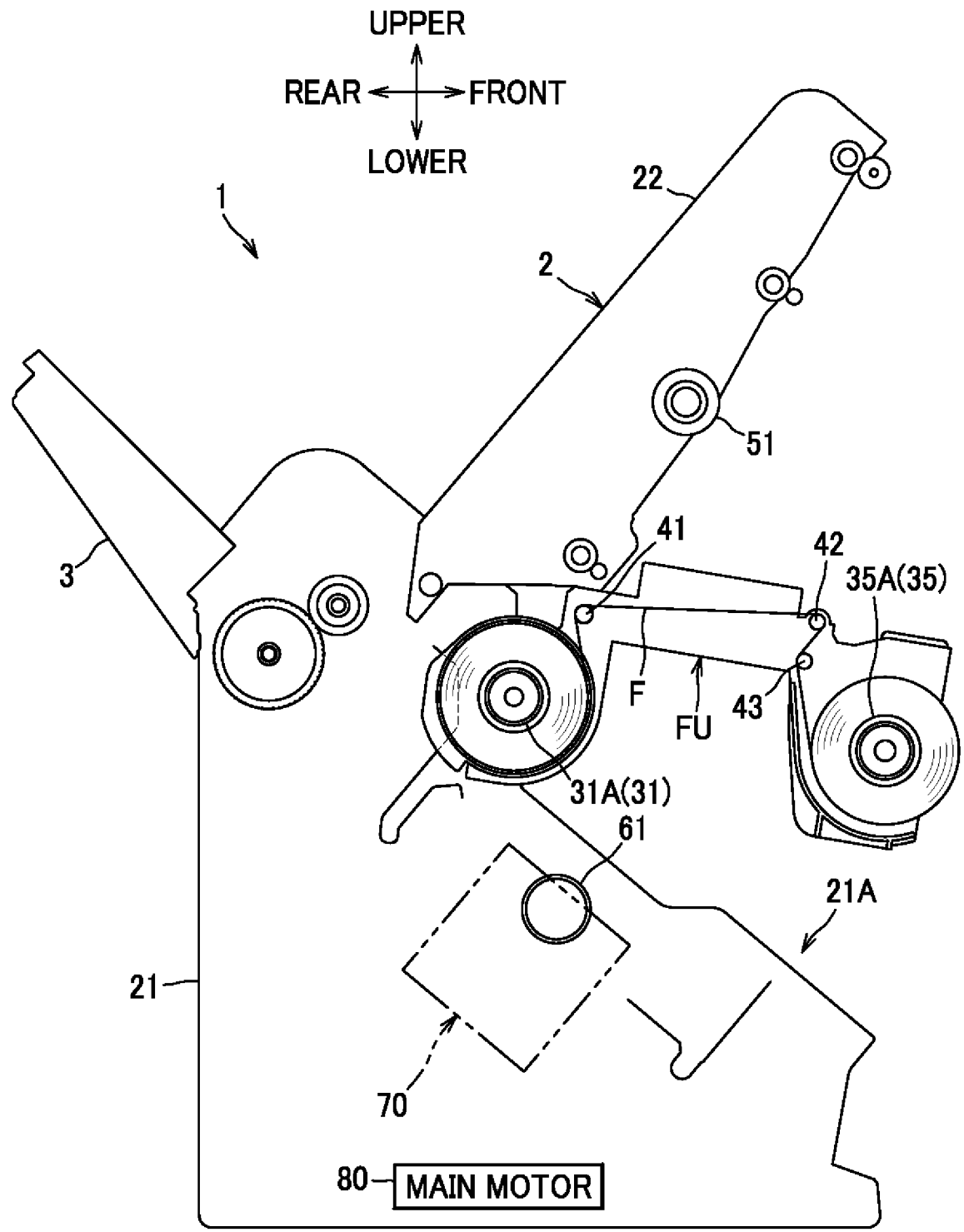
FIG. 2 is a diagram showing an open cover state of the layer transfer device.

The film unit FU is configured, as shown in FIG. 2, to be installable into and removable from the housing main body 21 through the opening 21A along a direction perpendicular to an axial direction of a supply reel 31 which will be described later. The film unit FU includes a supply reel 31, a take-up reel 35, a first guide shaft 41, a second guide shaft 42, and a third guide shaft 43. A multilayer film F is wound on the supply reel 31 of the film unit FU.

Figure 1B:
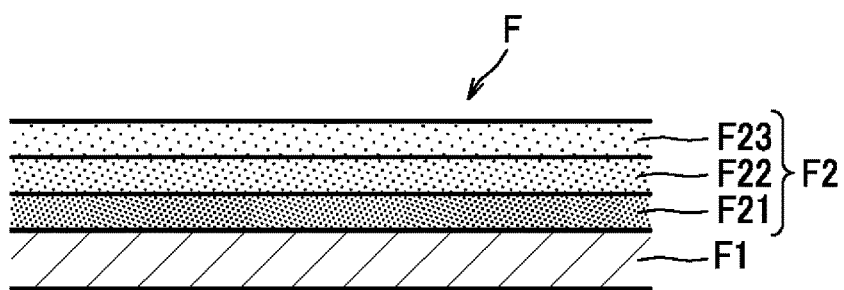
FIG. 1B is a section view showing a structure of a multilayer film.

As shown in FIG. 1B, the multilayer film F is a film made up of a plurality of layers. To be more specific, the multilayer film F includes a supporting layer F1 and a supported layer F2. The supporting layer F1 is a transparent substrate in the form of a tape and made of polymeric material, and supports the supported layer F2. The supported layer F2 includes several layers, such as a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a multilayer film F is wound. One end of the multilayer film F is fixed to the supply shaft 31A.

The take-up reel 35 is made of plastic or the like, and includes a take-up shaft 35A on which to take up the multilayer film F. The other end of the multilayer film F is fixed to the take-up shaft 35A.

It is to be understood that in FIG. 1 or other drawing figures, the supply reel 31 and the take-up reel 35 are illustrated as if the both reels were wound up to the maximum. In actuality, the film unit FU in new condition has its multilayer film F wound on the supply reel 31 in a roll of a maximum diameter, while no multilayer film F is wound on the take-up reel 35, or the multilayer film F is wound on the take-up reel 35 but in a roll of a minimum diameter. When the film unit FU is at the end of its life (i.e., the multilayer film F has been exhausted), the multilayer film F is wound on the take-up reel 35 in a roll of a maximum diameter, while no multilayer film F is wound on the supply reel 31, or the multilayer film F is wound on the supply reel 31 but in a roll of a minimum diameter.

The first guide shaft 41 is a shaft for changing a traveling direction of the multilayer film F drawn out from the supply reel 31. The first guide shaft 41 is made of plastic or the like.

The second guide shaft 42 is a shaft for changing a traveling direction of the multilayer film F guided by the first guide shaft 41. The second guide shaft 42 is made of plastic or the like.

The third guide shaft 43 is a shaft for changing a traveling direction of the multilayer film F guided by the second guide shaft 42 toward the take-up reel 35. The third guide shaft 43 is made of plastic or the like.

The first guide shaft 41 guides the multilayer film F drawn out from the supply reel 31 in such a manner that the multilayer film F is laid under a sheet S being conveyed with a toner image facing downward. The first guide shaft 41 changes a direction of conveyance of the multilayer film F drawn out from the supply reel 31, and guides the multilayer film F in a direction substantially parallel to the direction of conveyance of the sheet S.

The second guide shaft 42 is a separator roller that contacts the multilayer film F having passed through the transfer unit 50, and changes a direction of conveyance of the multilayer film F having passed through the transfer unit 50 into a direction different from a direction of conveyance of a sheet S, to thereby guide the multilayer film F in a direction away from the sheet S. The multilayer film F having passed through the transfer unit 50 and conveyed with the sheet S laid thereon goes past the second guide shaft 42 and is thus guided in the direction different from the direction of conveyance of the sheet S, and peeled from the sheet S.

The transfer unit 50 is a unit that heats and pressurizes the sheet S and the multilayer film F laid on each other, to transfer the transfer layer F22 onto a toner image formed on a sheet S. The transfer unit 50 includes a pressure roller 51, a heating roller 61, and a switching mechanism 70. The transfer unit 50 applies heat and pressure to portions of a sheet S and a multilayer film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the multilayer film F, and is contactable with a reverse side (opposite to a side on which a toner image is formed) of the sheet S.

The pressure roller 51 has two end portions supported rotatably by the cover 22. The pressure roller 51, which in combination with the heating roller 61, nips the sheet S and the multilayer film F, is driven to rotate by the main motor 80 and causes the heating roller 61 to rotate accordingly. In this way, the sheet S and the multilayer film F nipped between the pressure roller 51 and the heating roller 61 are conveyed according as the pressure roller 51 and the heating roller 61 rotate.

The heating roller 61 is a roller comprising a cylindrical metal tube with a heater located inside, to heat the multilayer film F and the sheet S. The heating roller 61 is located under the multilayer film F, and is in contact with the multilayer film F.

The switching mechanism 70 is a mechanism configured to switch a state of the pressure roller 51 and the heating roller 61 to a nip state in which the multilayer film F is nipped between the pressure roller 51 and the heating roller 61 and to a nip release state in which at least one of the rollers 51, 61 is located apart from the multilayer film F. In the present embodiment, the switching mechanism 70 causes the heating roller 61 to move between a nipping position indicated by a solid line in FIG. 6 and a separate position indicated by a phantom line in FIG. 6, to thereby bring the heating roller 61 into contact with the multilayer film F and separate the heating roller 61 from the multilayer film F. In other words, the switching mechanism 70 causes the heating roller 61 to be separated from the multilayer film F to switch the state of the pressure roller 51 and the heating roller 61 to the nip release state. On the other hand, the switching mechanism 70 causes the heating roller 61 to be brought into contact with and pressed against the multilayer film F to switch the state of the pressure roller 51 and the heating roller 61 to the nip state.

With the layer transfer device 1 configured as described above, sheets S stacked on the sheet tray 3 with front surfaces facing downward are conveyed one by one toward the transfer unit 50 by the sheet feed mechanism 11. Each sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F nipped and passing through between the pressure roller 51 and the heating roller 61 are heated and pressurized by the heating roller 61 and the pressure roller 51, so that the transfer layer F22 is transferred onto a toner image. In the following description, the transfer of the transfer layer F22 onto the toner image will be referred to simply as "layer transfer".

After the layer transfer is complete, the sheet S and the multilayer film F adhered to each other are conveyed to the second guide shaft 42. When the sheet S and the multilayer film F travels past the second guide shaft 42, the direction of conveyance of the multilayer film F is changed into a direction different from the direction of conveyance of the sheet S; thereby the multilayer film F is peeled from the sheet S.

The multilayer film F peeled from the sheet S is taken up on the take-up reel 35. On the other hand, the sheet S from which the multilayer film F is peeled has a foil transferred surface facing downward and is ejected to the outside of the housing 2 by the sheet ejection mechanism 12.

Figure 3:
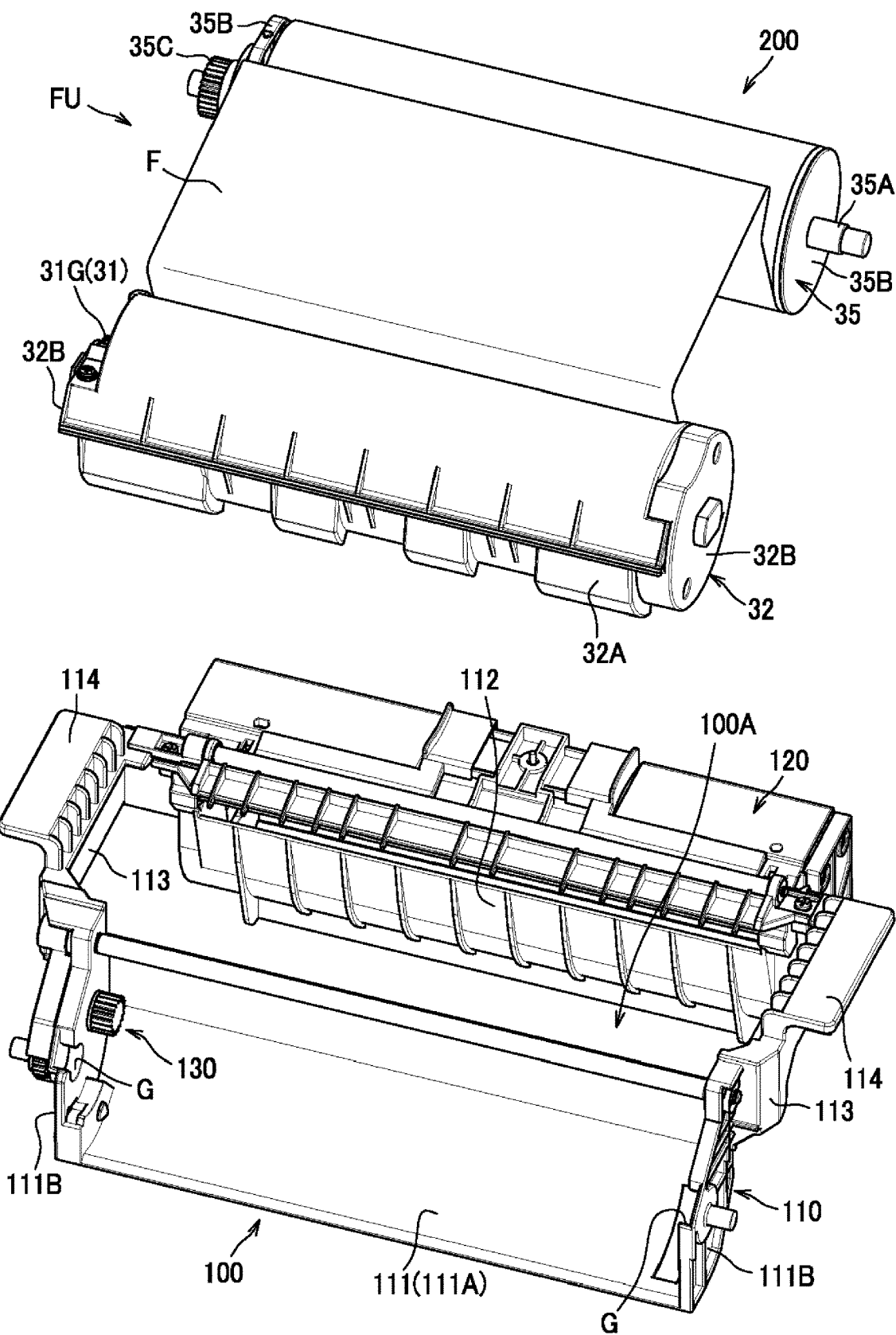
FIG. 3 is an exploded perspective view of a film unit as disassembled into a holder and a film cartridge.

As shown in FIG. 3, the film unit FU includes a holder 100 made of plastic or the like, and a film cartridge 200 installable into and removable from the holder 100. The film cartridge 200 includes a supply reel 31 and a take-up reel 35 on which a multilayer film F as described above is wound, and a supply case 32.

The supply reel 31 (more specifically, the supply case 32) and the take-up reel 35 are installable into and removable from the holder 100 in directions perpendicular to the axial direction of the supply reel 31. The film cartridge 200 installed in the holder 100 is configured to be installable into and removable from the housing main body 21.

The supply case 32 is a hollow case accommodating the supply reel 31. The supply case 32 is made of plastic or the like, and includes an outer peripheral wall 32A having a generally cylindrical shape, and two side walls 32B each having a generally discoidal shape. The two side walls 32B are provided at both ends of the outer peripheral wall 32A. The supply reel 31 is rotatably supported by the respective side walls 32B of the supply case 32.

The holder 100 includes a base frame 110 and a restraining frame 120 rotatably (movably) supported by the base frame 110. The base frame 110 includes a first holding portion 111, a second holding portion 112, two connecting portions 113 and two handles 114.

The first holding portion 111 is a portion that holds the supply case 32. The first holding portion 111 holds the supply reel 31 via the supply case 32. The first holding portion 111 includes an outer peripheral wall 111A having a substantially arcuate shape in cross section, and two side walls 111B.

The outer peripheral wall 111A is located along the outer peripheral surface of the supply case 32. The side wall 111B is located at each end of the outer peripheral wall 111A facing outward in the axial direction of the supply reel 31.

Each of the side walls 111B has an installation/removal guide G for guiding the supply case 32 when the supply case 32 is installed and removed. A gearing system 130 is provided at one of the two side walls 111B. The gearing system 130 is a mechanism for imposing on the supply reel 31 a load of a supply side torque limiter TL2 (see FIG. 6) provided in the housing main body 21. The structure of the gearing system 130 will be described later.

The second holding portion 112 is a portion that holds the take-up reel 35. To be more specific, the second holding portion 112 is combined with the restraining frame 120 to make up a hollow case, and the take-up reel 35 is accommodated in the hollow case.

The two connecting portions 113 are portions that connect the first holding portion 111 and the second holding portion 112. To be more specific, the connecting portions 113 are arranged apart from each other in the axial direction of the supply reel 31.

With the connecting portions 113 being formed in this way, the holder 100 is provided with a through hole 100A extending in a perpendicular direction perpendicular to the axial direction of the supply reel 31. The handle 114 is provided on each of the connecting portions 113. The handles 114 are located at opposite ends of the holder 100 corresponding to the ends of the take-up reel 35 apart from each other in the axial direction of the take-up reel 35.

The supply reel 31 includes a supply gear 31G provided at an end of the supply shaft 31A facing outward in a direction parallel to the axial direction of the supply reel 31. The supply gear 31G is exposed to outside through a cutaway opening formed in the supply case 32. The supply gear 31G is configured to be engageable with the gearing system 130 mentioned above when the film cartridge 200 is installed in the holder 100.

The take-up reel 35 includes, in addition to the take-up shaft 35A described above, two flanges 35B, and a take-up gear 35C. The flanges 35B are portions for restraining widthwise movement of the multilayer film F wound on the take-up shaft 35A. The flanges 35B are each formed in a shape of a disc having a diameter larger than that of the take-up shaft 35A, and provided at both end portions of the take-up shaft 35A.

The take-up gear 35C is a gear that receives a mechanical power from the main motor 80 provided in the layer transfer device 1 for transmitting the mechanical power to the take-up shaft 35A. The take-up gear 35C is located on an outside of the flange 35B facing outward in a direction parallel to the axial direction. The take-up gear 35C is located coaxially with take-up shaft 35A.

Figure 4:
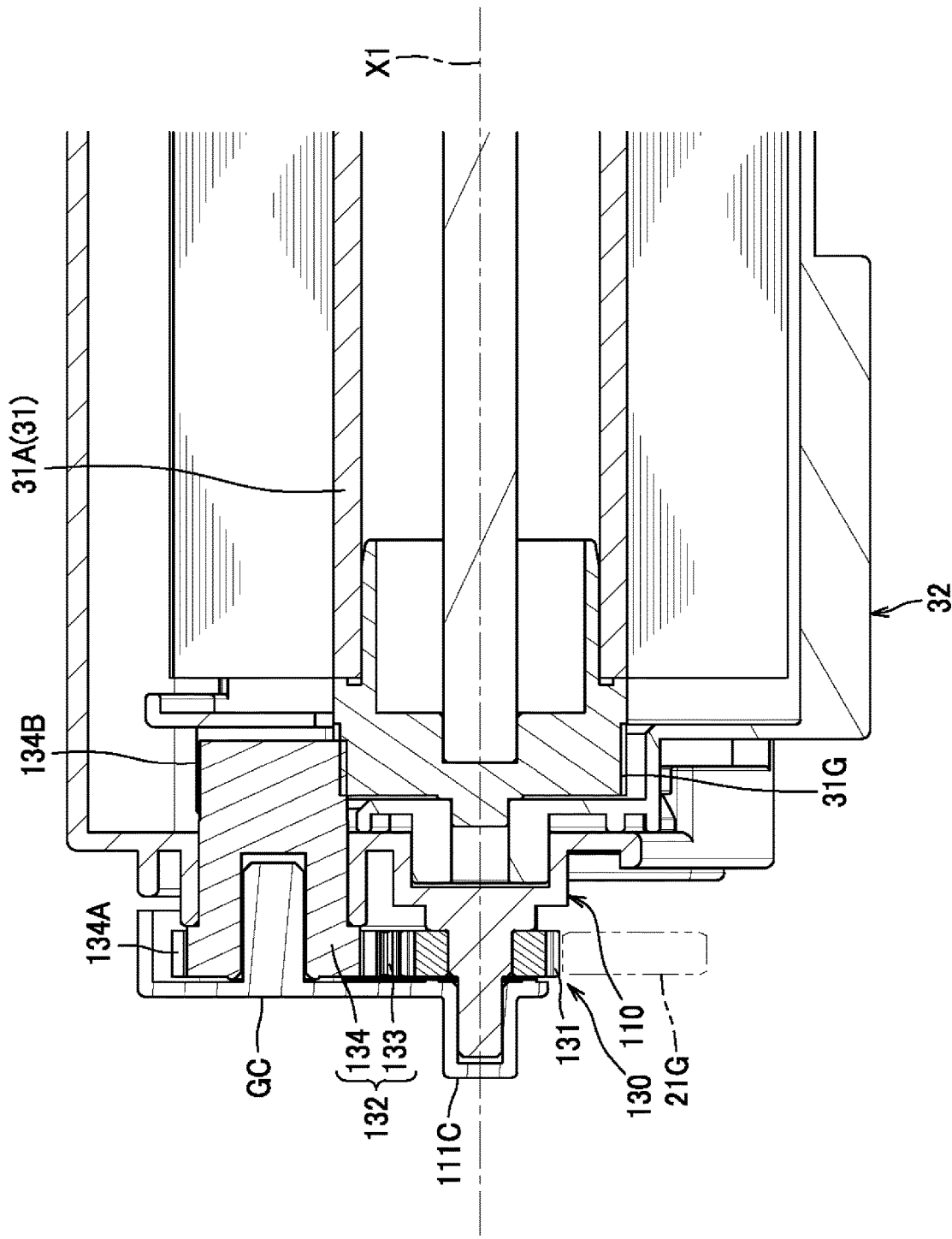
FIG. 4 is a section view showing a structure of part of the film unit around one of two ends of the supply reel apart from each other in an axial direction of the supply reel.

As shown in FIG. 4, the gearing system 130 for imposing a load on the supply reel 31 includes a frame gear 131 and a gear train 132. The frame gear 131 is a gear that engages with a housing gear 21G provided in the housing main body 21. The frame gear 131 is connected to a supply side torque limiter TL2, which will be described below, or the like via the housing gear 21G.

The gear train 132 is a gear train that connects the frame gear 131 and the supply gear 31G. The gear train 132 includes a first gear 133 and a second gear 134. The first gear 133 engages with the frame gear 131. The second gear 134 is a two-stage gear cluster and includes a large-diameter gear 134A and a small-diameter gear 134B.

The large-diameter gear 134A is a gear having a diameter larger than a diameter of the small-diameter gear 134B. The large-diameter gear 134A engages with the first gear 133. The small-diameter gear 134B engages with the supply gear 31G.

Figure 5:
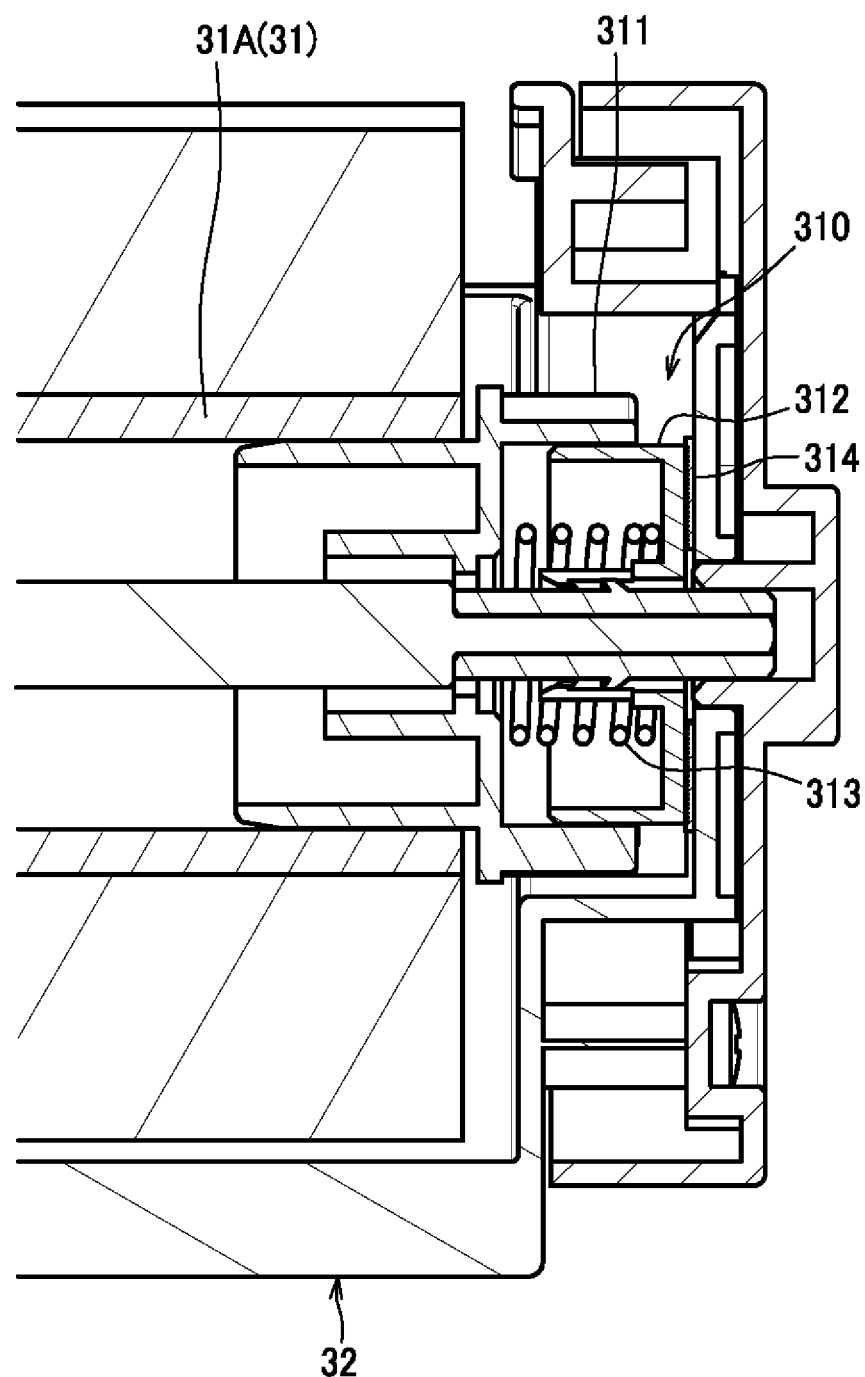
FIG. 5 is a section view showing a structure of part of the film unit around the other of the two ends of the supply reel.

As shown in FIG. 5, at the other end of the supply shaft 31A facing outward in a direction parallel to the axial direction of the supply reel 31 (that is, an end opposite to the end at which the supply gear 31G is provided), a first load imposing mechanism 310 is provided. The first load imposing mechanism 310 is a mechanism that imposes a first loading torque LT1 on the supply reel 31 by generating a frictional force between the supply reel 31 and the supply case 32 by which the supply reel 31 is rotatably supported.

The first load imposing mechanism 310 includes an anchor member 311, a movable member 312, a coil spring 313, and a friction pad 314. The supply shaft 31A of the supply reel 31 has a hollow cylindrical shape, and the anchor member 311 is fitted in the inner cylindrical surface of the supply shaft 31A and fixed to the supply reel 31. The movable member 312 is supported by the anchor member 311 movably in the axial direction relative to the anchor member 311 and rotatably together with the anchor member 311. The coil spring 313 is located between the anchor member 311 and the movable member 312. The friction pad 314 is located between the movable member 312 and the supply case 32 and fixed to the supply case 32. The movable member 312 is biased by the coil spring 313 outward in the axial direction of the supply reel 31, and pressed against the friction pad 314.

Accordingly, when the supply reel 31 rotates, a frictional force is produced between the movable member 312 and the friction pad 314, so that the first loading torque LT1 is imposed by the first load imposing mechanism 310 on the supply reel 31.

Figure 6:
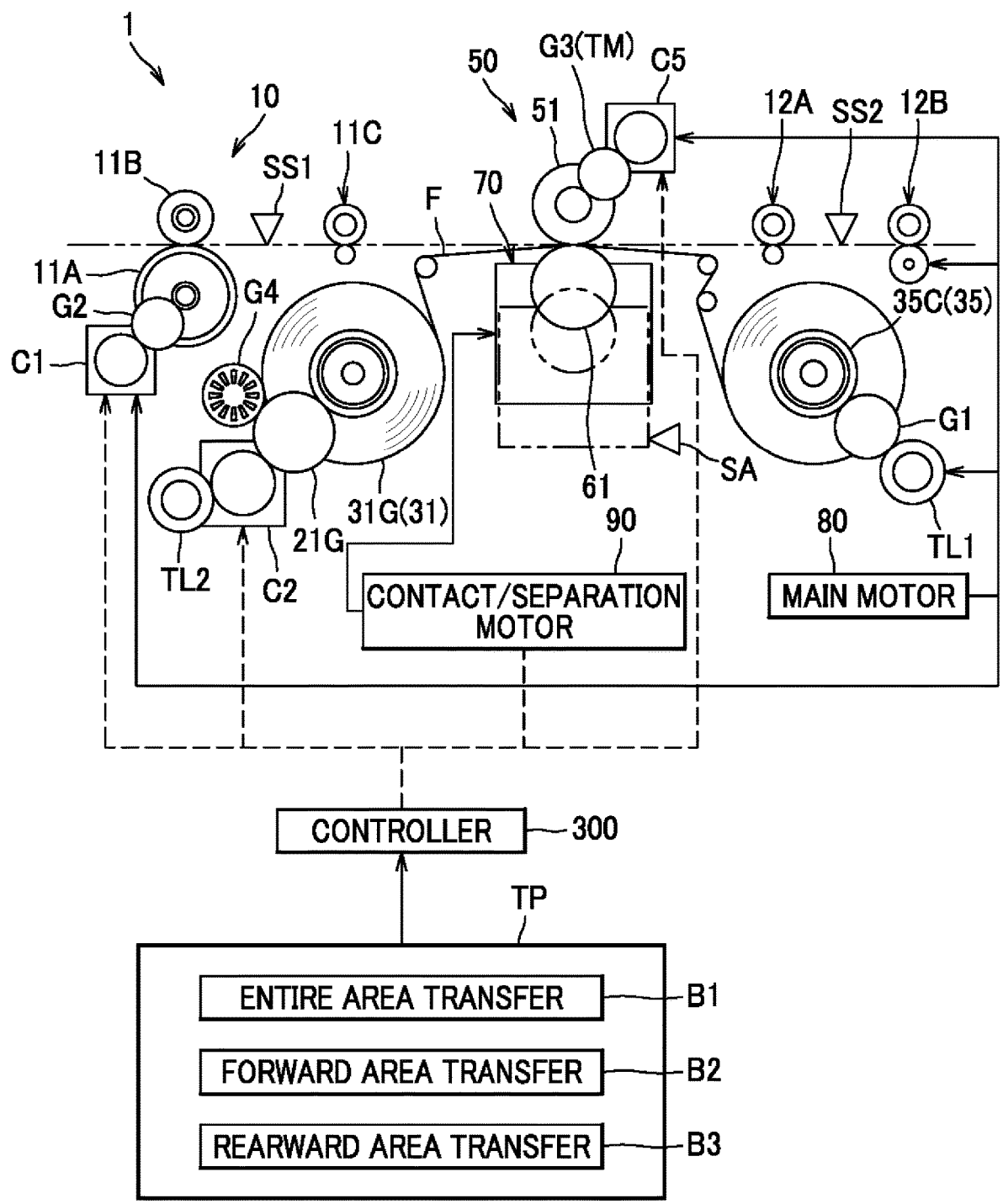
FIG. 6 is a simplified view of a structure of the layer transfer device.

As shown in FIG. 6, the driving force (mechanical power) generated by the main motor 80 is not only transmitted to the take-up reel 35 and the pressure roller 51 as described above, but also to the sheet conveyor unit 10. Here, in FIG. 6, the structure of the layer transfer device 1 is schematically illustrated for convenience's sake.

As a mechanism for transmitting the mechanical power generated by the main motor 80 to the take-up reel 35, the layer transfer device 1 mainly includes a take-up side torque limiter TL1 and a gear G1. The take-up side torque limiter TL1 has a function of limiting a driving torque DT generated by the main motor 80 and exerted on the take-up reel 35 to a value not greater than a predetermined value.

The take-up side torque limiter TL1 is connected via gearing (not shown) to the main motor 80. The take-up side torque limiter TL1 is connected via a gear G1 to the take-up gear 35C.

As a mechanism for transmitting the mechanical power generated by the main motor 80 to the sheet conveyor unit 10, the layer transfer device 1 mainly includes a pickup clutch C1 and a gear G2. The pickup clutch C1 is an electromagnetic clutch for switching a state of transmission of the mechanical power from the main motor 80 to the pickup roller 11A between a transmitting state and a shut-off state.

The pickup clutch C1 is connected via gearing (not shown) to the main motor 80. The pickup clutch C1 is connected via a gear G2 to the pickup roller 11A. Among several rollers that make up the sheet conveyor unit 10, rollers other than the pickup roller 11A are connected via gearing (not shown) to the main motor 80.

As a mechanism for transmitting the mechanical power generated by the main motor 80 to the pressure roller 51, the layer transfer device 1 mainly includes a transmission mechanism TM and a roller clutch C5. The roller clutch C5 is an example of a transmission switching mechanism. The transmission mechanism TM is a mechanism that transmits the mechanical power generated by the main motor 80 to the pressure roller 51. The transmission mechanism TM includes a gear G3 for transmitting the mechanical power from the roller clutch C5 to the pressure roller 51, and gearing (not shown) for transmitting the mechanical power from the main motor 80 to the roller clutch C5.

The roller clutch C5 is an electromagnetic clutch capable of switching a state of the transmission mechanism TM to a transmitting state in which the mechanical power is transmitted to the pressure roller 51 and to a shut-off state in which transmission of the mechanical power to the pressure roller 51 is shut off.

The layer transfer device 1 further includes a supply side torque limiter TL2, a reel clutch C2, a contact/separation motor 90, a touch panel TP, and a controller 300. The touch panel TP is an example of an operating unit.

The supply side torque limiter TL2 is a member for imposing a second loading torque LT2 on the supply reel 31. Herein, the second loading torque LT2 has a set value greater than a value obtained by subtracting the aforementioned first loading torque LT1 from the driving torque DT exerted on the take-up reel 35. The aforementioned first loading torque LT1 has a set value smaller than the driving torque DT exerted on the take-up reel 35. The supply side torque limiter TL2 is an example of a load imposing device. The supply side torque limiter TL2 and the reel clutch C2 that operate in cooperation implements a torque changer capable of turning a balance between a loading torque LT exerted on the supply reel 31 and the driving torque DT exerted on the take-up reel 35.

The supply side torque limiter TL2 is connected to the reel clutch C2. The reel clutch C2 is an electromagnetic clutch capable of changing a state of connection between the supply side torque limiter TL2 and the supply reel 31. The magnitude of the loading torque LT exerted on the supply reel 31 is changed by the reel clutch C2 changing the state of connection between the supply side torque limiter TL2 and the supply reel 31. To be more specific, when the supply side torque limiter TL2 is disconnected from the supply reel 31, the loading torque LT exerted on the supply reel 31 takes on the first loading torque LT1 that is a value smaller than the driving torque DT. On the other hand, when the supply side torque limiter TL1 is connected to the supply reel 31, the loading torque LT exerted on the supply reel 31 takes on a value obtained by adding the second loading torque LT2 to the first loading torque LT1, and this value is greater than the driving torque DT.

The reel clutch C2 is connected via the housing gear 21G and the aforementioned gearing system 130 (not shown) to the supply gear 31G. The housing gear 21G is in mesh with an encoding gear G4. The encoding gear G4 includes a rotary disc having a plurality of slits formed therein, as an element of a rotary encoder which further includes, for example, a light source and an optical sensor though not illustrated so that a light beam emitted from the light source passes through slits in the rotary disc of the encoding gear G4 and is detected by the optical sensor. Accordingly, the rotational speed of the supply reel 31 can be determined.

The contact/separation motor 90 is a motor configured to cause the switching mechanism 70 to operate and switch the state of the pressure roller 51 and the heating roller 61 to the nip state and to the nip release state. In the vicinity of the switching mechanism 70, a separation sensor SA is provided to detect that the state of the pressure roller 51 and the heating roller 61 set by the switching mechanism 70 is the nip release state. The separation sensor SA is an example of a state detection sensor. The separation sensor SA may, for example, be an optical sensor.

A first sheet sensor SS1 as an example of a sheet detection sensor is provided between the pickup roller 11A and the upstream conveyor roller 11C. The first sheet sensor SS1 is configured to detect a sheet S conveyed toward the transfer unit 50 when the sheet S goes past the first sheet sensor SS1. A second sheet sensor SS2 is provided between the downstream conveyor roller 12A and the ejection roller 12B. The second sheet sensor SS2 is configured to detect a sheet S conveyed from the transfer unit 50 when the sheet S goes past the second sheet sensor SS2.

Each of the first sheet sensor SS1 and the second sheet sensor SS2 may be configured, for example, to include a lever that turns about a pivot upon contact with a sheet S, and an optical sensor that detects the position of the lever. With this configuration, the first sheet sensor SS1 can detect that a leading edge of a sheet S goes past the first sheet sensor SS1 and that a trailing edge of the sheet S goes past the first sheet sensor SS1; similarly, the second sheet sensor SS2 can detect that the leading edge of the sheet S goes past the second sheet sensor SS2 and that the trailing edge of the sheet S goes past the second sheet sensor SS2.

When a sheet S comes in contact with the lever of the first sheet sensor SS1, the lever is caused to turn to a first position. While the sheet S is in contact with the lever, the lever is kept in the first position. When the sheet S goes past the first sheet sensor SS1, and comes out of contact with the lever, the lever is caused to turn to a second position. Since the period of time for which the lever of the first sheet sensor SS1 is in contact with a sheet S and thus is in the first position is directly proportional to the length of the sheet S in the direction of conveyance of the sheet S, the length of the sheet S in the direction of conveyance of the sheet S can be determined from detection signals of the first sheet sensor SS1, more specifically, based on times of detection of the leading and trailing edges of the sheet S by the first sheet sensor SS1.

In order to avoid sagging of the multilayer film F between the pressure roller 51 (specifically, the nip position at which a sheet S is to be nipped between the pressure roller 51 and the heating roller 61) and the take-up reel 35, the peripheral velocity of the take-up reel 35 (i.e., peripheral velocity of a roll of the multilayer film F being wound on the take-up shaft 35A) is set at a velocity greater than the peripheral velocity of the pressure roller 51. To be more specific, the transmission mechanism TM for transmitting the mechanical power generated by the main motor 80 to the pressure roller 51 and the mechanism for transmitting the mechanical power generated by the main motor to the take-up reel 35 are configured to meet the aforementioned criterion of the peripheral velocities.

When the multilayer film F is nipped between the pressure roller 51 and the heating roller 61, the rotation of the take-up shaft 35A is restricted by the peripheral velocity of the pressure roller 51; thus, during the layer transfer, the actual peripheral velocity of the take-up reel 35 (of the roll of the multilayer film F being wound on the take-up shaft 35A) is substantially equal to the actual peripheral velocity of the pressure roller 51. Therefore, the aforementioned peripheral velocity of the take-up reel 35 is a hypothetical peripheral velocity as assumed to be measured if the multilayer film F travels with the loading torque LT smaller than the driving torque DT under the nip release state in which at least one of the pressure roller 51 and the heating roller 61 is located apart from the multilayer film F. It is understood that the peripheral velocity of the take-up reel 35 in the actual control process would not take on such a hypothetical peripheral velocity.

In the present embodiment, the aforementioned torque changer (supply side torque limiter TL2, first load imposing mechanism 310, and reel clutch C2), the switching mechanism 70, and the transmission switching mechanism (roller clutch C5) operates in combination and functions as a releasable restraining device. The releasable restraining device is configured to be capable of switching to a restraining state in which the multilayer film F is put under restraint in being drawn out from the supply reel 31 and to a release state in which the restraint is lifted.

To be more specific, when the switching mechanism 70 keeps the state of the pressure roller 51 and the heating roller 61 in the nip release state, regardless of the state of the roller clutch C5, if the reel clutch C2 is switched to a connecting state to result in LT>DT, then the releasable restraining device switches to the restraining state, while if the reel clutch C2 is switched to a disconnecting state to result in LT<DT, then the releasable restraining device switches to the release state. When the switching mechanism 70 keeps the state of the pressure roller 51 and the heating roller 61 in the nip state and the reel clutch C2 has been switched to the disconnecting state to result in LT<DT, if the roller clutch C5 is switched to a disconnecting state, i.e., a shut-off state, then the releasable restraining device switches to the restraining state, while if the roller clutch C5 is switched to a connecting state, i.e., a transmitting state, then the releasable restraining device switches to the release state. When the reel clutch C2 has been switched to the connecting state to result in LT>DT and the roller clutch C5 is in the connecting state, if the switching mechanism 70 switches the state of the pressure roller 51 and the heating roller 61 to the nip release state, then the releasable restraining device switches to the restraining state, while if the switching mechanism 70 switches the state of the pressure roller 51 and the heating roller 61 to the nip state, then the releasable restraining device switches to the release state.

The touch panel TP is a panel that displays buttons or the like to be touched by a user for giving instructions on operation or a choice from options, to the controller 300. Specifically, the touch panel TP is configured to display a first button B1 for execution of a layer transfer process in an entire area transfer mode, a second button B2 for execution of the layer transfer process in a forward area transfer mode, and a third button B3 for execution of the layer transfer process in a rearward area transfer mode.

Herein, the entire area transfer mode is a mode in which the layer transfer process is executed for a toner area TA (see FIG. 7A) formed in an entire area (specifically, the whole area in which an image can be formed) of the sheet S. The toner area TA is an image area in which a toner image of text, graphics, etc. is formed.

The forward area transfer mode is a mode in which the transfer layer F22 is transferred onto a toner area TA of which a distance to a leading edge of the sheet S is shorter than a distance to a trailing edge of the sheet S. In this embodiment, the toner area TA onto which the transfer layer F22 is to be transferred in the forward area transfer mode is a forward off-centered area of the sheet S that is shifted forward (i.e., closer to the leading edge and farther from the trailing edge) or on a front side with respect to the center of the sheet S in the direction of conveyance of the sheet S.

The rearward area transfer mode is a mode in which the transfer layer F22 is transferred onto a toner area TA of which a distance to the trailing edge of the sheet S is shorter than a distance to the leading edge of the sheet S. In this embodiment, the toner area TA onto which the transfer layer F22 is to be transferred in the rearward area transfer mode is a rearward off-centered area of the sheet S that is shifted rearward (i.e., closer to the trailing edge and farther from the leading edge) with respect to the center of the sheet S in the direction of conveyance of the sheet S.

A user can choose any one of the transfer modes by touching a corresponding button chosen among the buttons B1 to B3 displayed on the touch panel TP.

If the user touches the first button B1, then the touch panel TP outputs to the controller 300 an entire area transfer instruction to execute the layer transfer process in the entire area transfer mode. If the user touches the second button B2, then the touch panel TP outputs to the controller 300 a forward area transfer instruction to execute the layer transfer process in the forward area transfer mode. If the user touches the third button B3, then the touch panel TP outputs to the controller 300 a rearward area transfer instruction to execute the layer transfer process in the rearward area transfer mode.

The touch panel TP is provided, as shown in FIG. 1, on a top side of the cover 22, for example.

The controller 300 includes a central processing unit (CPU), a random-access memory (RAM), a read-only memory (ROM), and an input/output processor circuit. The controller 300 executes processes of control by performing a variety of computations and operations based on programs and data stored in the ROM, etc. The controller 300 is configured to be capable of executing a layer transfer process in any one the modes described above based on instructions outputted from the touch panel TP.

Control over the releasable restraining device exercised by the controller 300 in each of the modes when the main motor 80 is generating a mechanical power is such that the releasable restraining device is in the restraining state if the toner area TA is not present in a layer transfer position between the heating roller 61 and the pressure roller 51. Also, control over the releasable restraining device exercised by the controller 300 in each of the modes when the main motor 80 is generating a mechanical power is such that the releasable restraining device is in the release state if the toner area TA on the sheet S is present in the layer transfer position.

As shown in FIGS. 7A to 7D, the distinct difference among the modes lies in the timing of switching the position of the heating roller 61. In the initial state where the layer transfer process is not executed, the heating roller 61 is in a separate position.

Figure 7A:
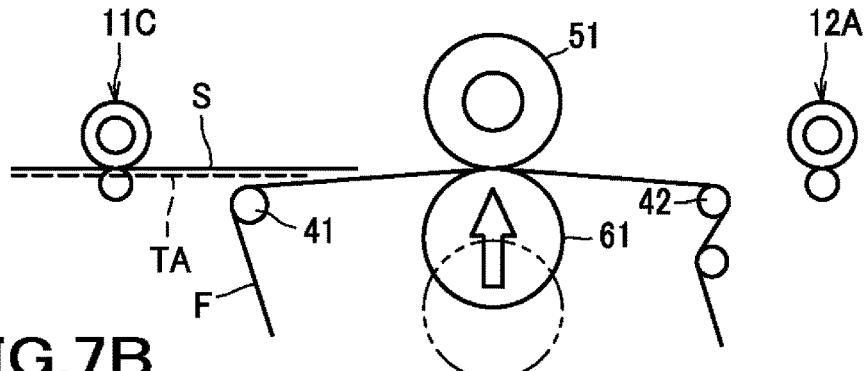
FIGS. 7A, 7B, 7C and 7D are diagrams for clarifying distinction among an entire area transfer process, a forward area transfer process, and a rearward area transfer process.

As shown in FIG. 7A, in the pre-transfer process of control in the entire area transfer mode (control exercised before layer transfer onto the toner area TA), the controller 300 causes the heating roller 61 to move from the separate position to a nipping position before the leading edge of the sheet S reaches the layer transfer position between the heating roller 61 and the pressure roller 51.

Figure 7B:
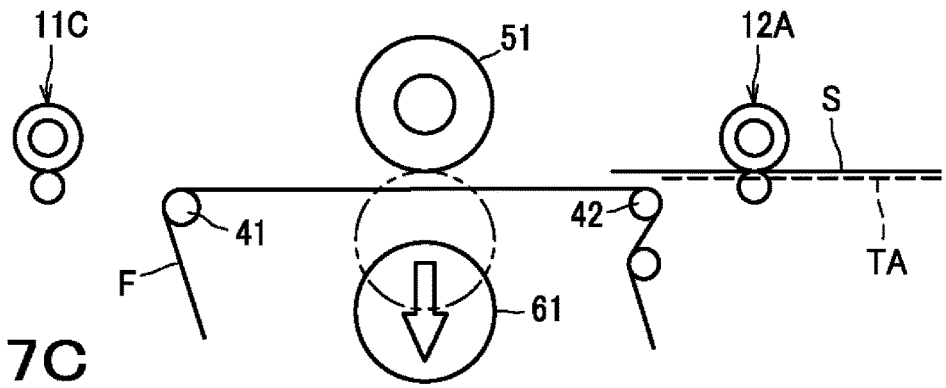

As shown in FIG. 7B, in the post-transfer process of control in the entire area transfer mode (control exercised after layer transfer onto the toner area TA), the controller 300 causes the heating roller 61 to move from the nipping position to the separate position after the trailing edge of the sheet S goes past the layer transfer position.

Figure 7C:
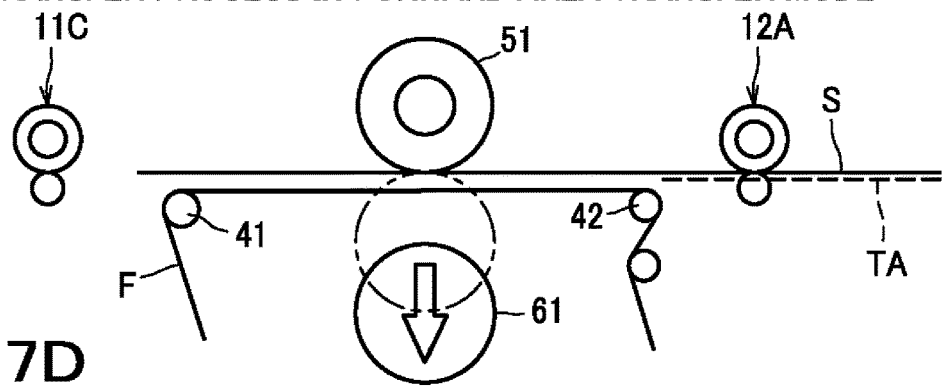

The pre-transfer process of control in the forward area transfer mode is the same as the pre-transfer process of control in the entire area transfer mode (see FIG. 7A). As shown in FIG. 7C, in the post-transfer process of control in the forward area transfer mode, unlike the corresponding process of control in the entire area transfer mode, the controller 300 causes the heating roller 61 to move from the nipping position to the separate position before the trailing edge of the sheet S goes past the layer transfer position.

Figure 7D:
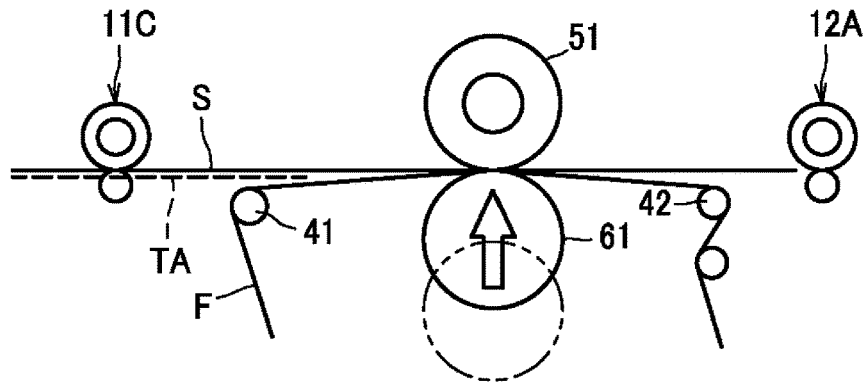

As shown in FIG. 7D, in the pre-transfer process of control in the rearward area transfer mode, unlike the corresponding process of control in the entire area transfer mode, the controller 300 causes the heating roller 61 to move from the separate position to the nipping position after the leading edge of the sheet S goes past the layer transfer position. The post-transfer process of control in the rearward area transfer mode is the same as the post-transfer process of control in the entire area transfer mode (see FIG. 7B).

Since difference is made in the timing of movement of the heating roller 61 among the modes as described above, the timing of switching the state of the releasable restraining device is made different as desired. To be exact, besides the timing of movement of the heating roller 61, the reel clutch C2 and the roller clutch C5 are switched in harmony as well, so that the timing of switching the state of the releasable restraining device is made different.

Next, a description of the operation of the controller 300 will be given in detail. When the layer transfer device 1 is powered on, the controller 300 repeatedly executes a process shown in FIG. 8.

In the process shown in FIG. 8, the controller 300, first, makes a determination as to whether or not an entire area transfer instruction has been received (S101). If it is determined in step S101 that the entire area transfer instruction has been received (Yes), then the controller 300 executes an entire area transfer process (S102), and brings this round of the process to an end.

If it is determined in step S101 that the entire area transfer instruction has not been received (No), then the controller 300 further makes a determination as to whether or not a forward area transfer instruction has been received (S103). If it is determined in step S103 that the forward area transfer instruction has been received (Yes), then the controller 300 executes the forward area transfer process (S104), and brings this round of the process to an end.

If it is determined in step S103 that the forward area transfer instruction has not been received (No), then the controller 300 further makes a determination as to whether or not a rearward area transfer instruction has been received (S105). If it is determined in step S105 that the rearward area transfer instruction has been received (Yes), then the controller 300 executes the rearward area transfer process (S106), and brings this round of the process to an end. If it is determined in step S105 that the rearward area transfer instruction has not been received (No), then the controller 300 brings this round of the process to an end.

Figure 9:
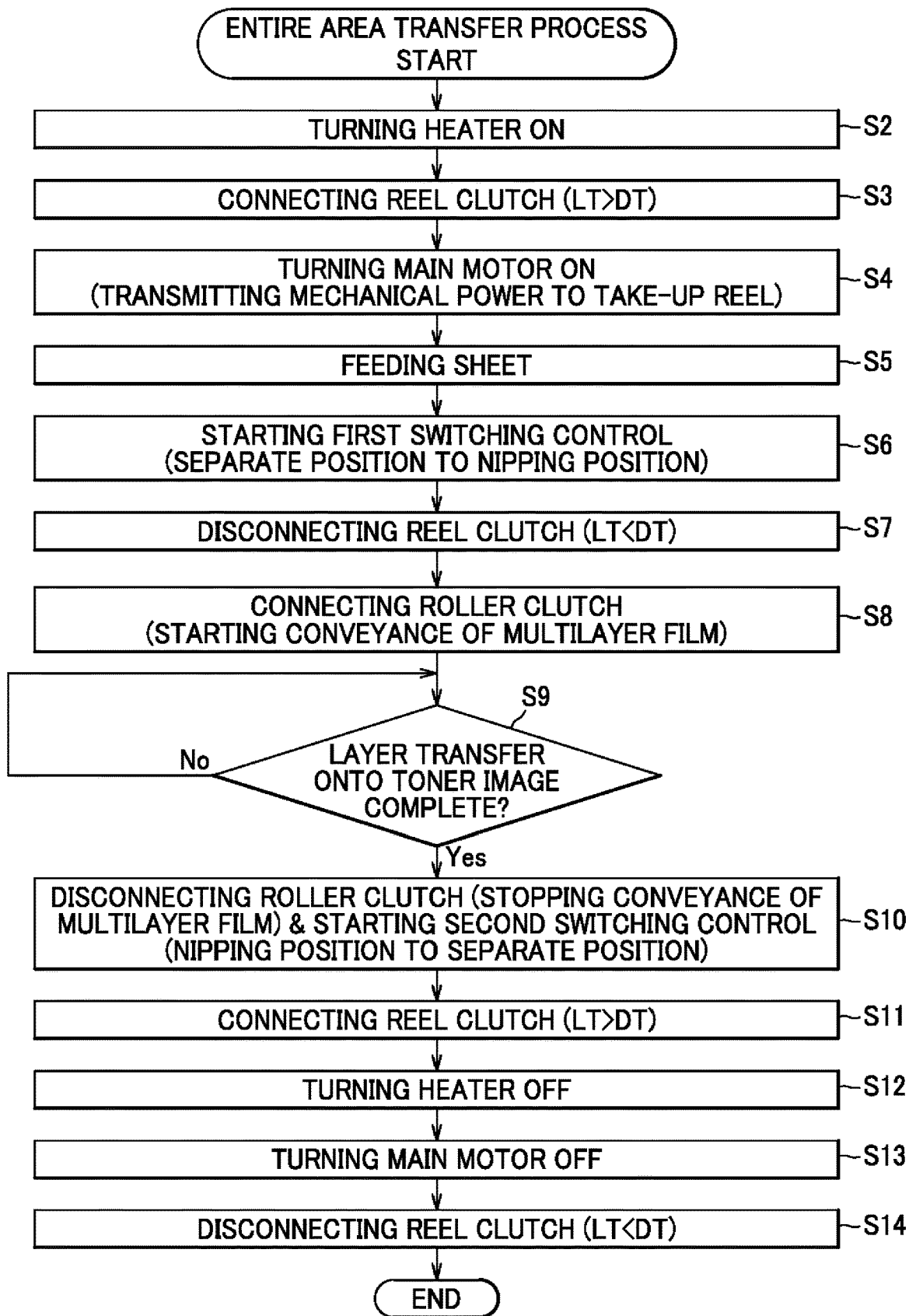
FIG. 9 is a flowchart showing the entire area transfer process.
Figure 12:
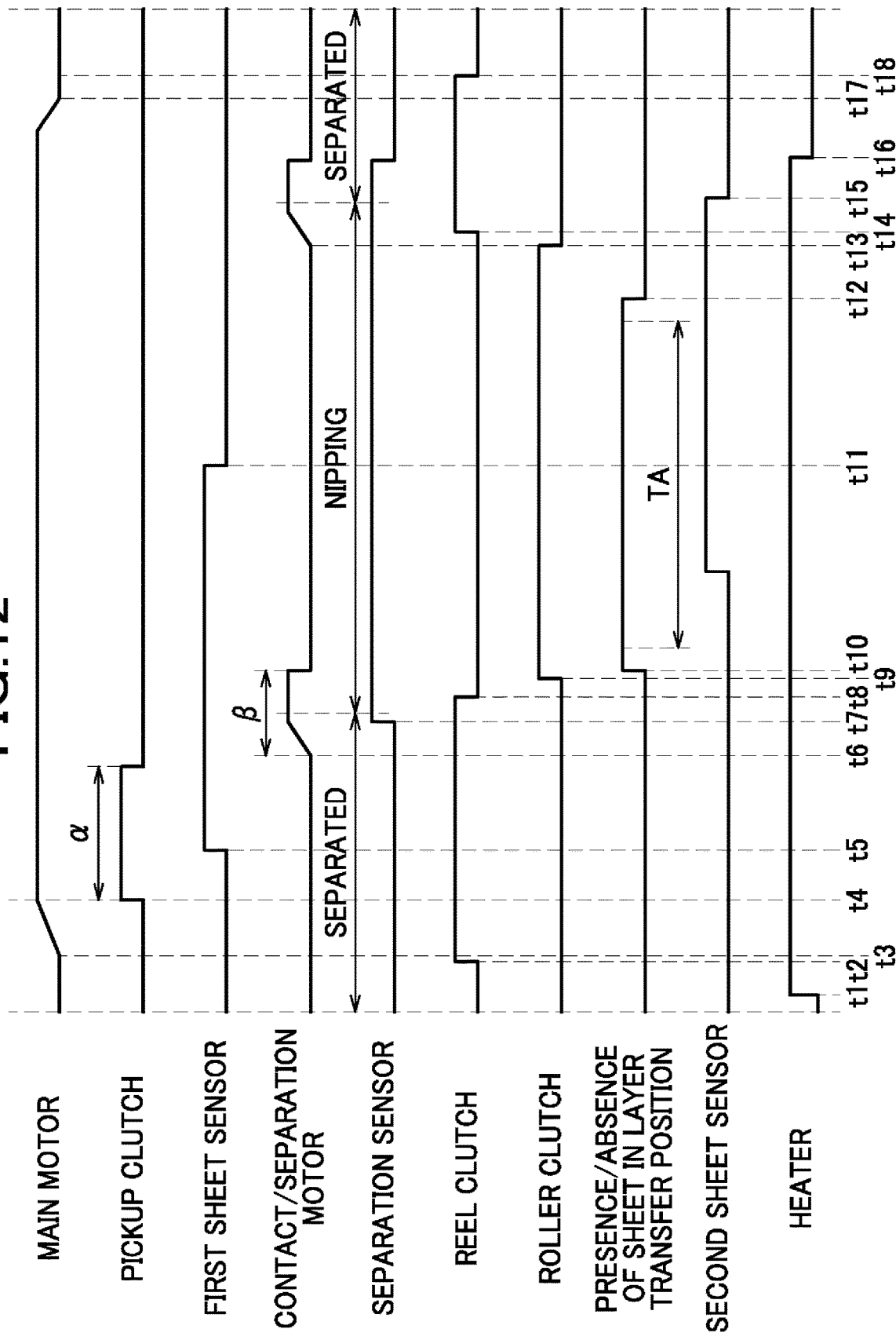
FIG. 12 is a timing chart showing timings of sequential operations of relevant components as timed for the entire area transfer process.

Referring now to FIG. 9 and FIG. 12, the entire area transfer process will be described below.

In the entire area transfer process, the controller 300 first turns the heater in the heating roller 61 on (in step S2 in FIG. 9, at time t1 in FIG. 12), and then switches the reel clutch C2 to the connecting state (step S3, time t2). Although a time interval between time t1 and time t2 is illustrated in FIG. 12 as a relatively short duration for the sake of clarity, the connection in the reel clutch C2 in actuality may not occur until the temperature of the heating roller 61 is raised to a temperature sufficiently close to a target temperature, and occur after a lapse of longer duration of time than illustrated from the turn-on of the heater. It is to be understood that the illustrated time intervals do not reflect actual proportions thereof for the purpose of making the order of the points in time of operations of the relevant components more legible.

When the reel clutch C2 is switched to the connecting state in step S3, the loading torque LT takes on LT1+LT2, greater than the driving torque DT. After step S3, the controller 300 turns the main motor 80 on (step S4, time t3). In other words, the controller 300 is configured such that when the main motor 80 is caused to start generating mechanical power upon receipt of the entire area transfer instruction, the releasable restraining device is in the restraining state. When the main motor 80 is powered on, the mechanical power generated by the main motor 80 is transmitted via the take-up side torque limiter TL1 to the take-up reel 35. Accordingly, the driving torque DT is applied to the take-up reel 35; however, because LT>DT as a result of the process in step S3, the multilayer film F is restrained by the loading torque LT from being drawn out from the supply reel 31. As a result, the multilayer film F is pulled by the take-up reel 35 to which the driving torque DT is applied; however, as the supply reel 31 and the take-up reel 35 stop rotating, the multilayer film F stops under a predetermined tension without being conveyed.

After step S4, the controller 300 switches the pickup clutch C1 to a connecting state, i.e., transmitting state, and starts feeding a sheet S (step S5, time t4). To be more specific, the controller 300 is configured to pass an electric current through the pickup clutch C1 for a time period α required to convey a single sheet S by the pickup roller 11A, so that the pickup roller 11A is caused to operate (rotate) for a predetermined period of time. It is to be understood that the time to stop the operation of the pickup roller 11A may be determined based on a time of detection of the leading edge of the sheet S by the first sheet sensor SS1.

After step S5, the controller 300 turns the contact/separation motor 90 on, and starts a first switching control to move the heating roller 61 from the separate position to the nipping position (step S6, time t6). To be more specific, the controller 300 is configured to pass an electric current through the contact/separation motor 90 for a time period β required for the motion of the heating roller 61 in the process of the first switching control. The controller 300 is configured to exercise a second switching control which will be described later, in such a manner as followed in the first switching control.

After step S6, specifically, after the heating roller 61 moves to the nipping position, the controller 300 switches the reel clutch C2 to the disconnecting state (step S7, time t8). Accordingly, after the state of the pressure roller 51 and the heating roller 61 is switched to the nip state, the loading torque LT takes on LT1, which is smaller than the driving torque DT. Supposing the loading torque LT were made smaller than the driving torque DT before switching of the state of the pressure roller 51 and the heating roller 61 to the nip state, the take-up reel 35 would start rotating and the multilayer film F would be conveyed uselessly and taken up to waste. Therefore, it is proposed as described above that the loading torque LT be made smaller than the driving torque DT after the state of the pressure roller 51 and the heating roller 61 is switched to the nip state (i.e., after the multilayer film F is nipped between the pressure roller 51 and the heating roller 61), so that the start of rotation of the take-up reel 35 is deferred. Consequently, useless conveyance of the multilayer film F can be restrained.

After step S7, the controller 300 switches the roller clutch C5 to the connecting state (step S8, time t9). Accordingly, mechanical power is transmitted from the main motor 80 to the pressure roller 51 and causes the pressure roller 51 and the heating roller 61 to rotate, so that the multilayer film F starts being conveyed.

It is preferable that the process in step S8 be executed for a period of time after the heating roller 61 and the pressure roller 51 start nipping the multilayer film F before the leading edge of the sheet S reaches the layer transfer position. In this embodiment, the process in step S8 is executed for a period of time after the heating roller 61 comes to the nipping position before the leading edge of the sheet S reaches the layer transfer position.

The process steps S6 to S8 correspond to a restraint release process in which the releasable restraining device is caused to switch to the release state, for a period of time after the leading edge of the sheet S goes past the upstream conveyor roller 11C before the toner area TA reaches the layer transfer position. The restraint release process is a process for starting conveyance of the multilayer film F, and thus may preferably be executed immediately before the time t10 at which the sheet S reaches the layer transfer position between the pressure roller 51 and the heating roller 61. The timing of executing each of steps S6 to S8 may be determined based on the time t5 of detection of the leading edge of the sheet S by the first sheet sensor SS1.

Execution of the steps S6 to S8 may preferably be timed to substantially coincide with one another. The steps S6 to S8 may be executed in an order different from that in the present embodiment, and may be executed at the same time.

The timing of switching the reel clutch C2 to the disconnecting state may be determined, for example, based on the time at which the contact/separation motor 90 is turned on (time t6) or the time at which a signal indicative that the heating roller 61 is not in the separate position is received from the separation sensor SA (time t7). Herein, the separation sensor SA is configured to output a first signal (e.g., Low signal) while the heating roller 61 is in the separate position, and to output a second signal (e.g., High signal) immediately after the heating roller 61 starts moving from the separate position. Thus, the heating roller 61 reaches the nipping position at a point in time after receipt of the second signal from the separation sensor SA within the time period β during which the contact/separation motor 90 is operating. Therefore, the timing of switching the reel clutch C2 to the disconnecting state may be determined based on the aforementioned times (t6, t7).

After step S8, the controller 300 makes a determination as to whether or not a layer transfer onto a toner image in the toner area TA is complete (S9). Specifically, the controller 300 makes the determination as to completion of the layer transfer, based on the time elapsed from the time (time t11) of detection of the trailing edge of the sheet S by the first sheet sensor SS1. The time of completion of the layer transfer may be a point in time at which the trailing edge of the toner area TA of the sheet S goes past the layer transfer position, or a point in time at which the trailing edge of the sheet S goes past the layer transfer position, or a point in time at which the trailing edge of the toner area TA of the sheet S goes past the second guide shaft 42 (see FIG. 1) as the separator roller.

In the present embodiment, the time of completion of the layer transfer is set at a point in time at which the trailing edge of the toner area TA of the sheet S goes past the second guide shaft 42, i.e., the time t13 of expiry of a predetermined time period from the time t12 at which the trailing edge of the sheet S has gone past the layer transfer position. With the time of completion of the layer transfer set as described above, the multilayer film F can be restrained from stopping before completion of separation (peeling) of the multilayer film F from the toner image on the sheet S, so that the multilayer film F can be peeled clean from the toner image.

If it is determined in step S9 that the layer transfer is complete (Yes), then the controller 300 switches the roller clutch C5 to the disconnecting state, and turns the contact/separation motor 90 on, so as to start a second switching control to move the heating roller 61 from the nipping position to the separate position (step S10, time t13). In the illustrated example, the switching of the roller clutch C5 to the disconnecting state and the turning-on of the contact/separation motor 90 are controlled to take place simultaneously, though they may be timed to take place at different times.

As the roller clutch C5 is switched to the disconnecting state in step S10, the transmission of the mechanical power from the main motor 80 to the pressure roller 51 is shut off. Accordingly, the pressure roller 51 and the heating roller 61 stop rotating, and the conveyance of the multilayer film F is stopped. As the contact/separation motor 90 is turned on in step S10, the heating roller 61 starts moving from the nipping position to the separate position.

In other words, the controller 300 starts switching the roller clutch C5 from the transmitting state to the shut-off state after the trailing edge of the sheet S goes past the layer transfer position (after time t12) before the switching mechanism 70 switches the state of the heating roller 61 and the pressure roller 51 to the nip release state, that is, before the heating roller 61 reaches the separate position.

After step S10, specifically, for a time period from the time at which the heating roller 51 starts moving toward the separate position to the time at which the heating roller 51 reaches the separate position (preferably, before the heating roller 61 separates from the multilayer film F), the controller 300 switches the reel clutch C2 to the connecting state (step S11, time t14). Therefore, the multilayer film F is nipped between the pressure roller 51 and the heating roller 61 before the reel clutch C2 is switched to the connecting state, so that the conveyance of the multilayer film F is stopped.

The loading torque LT produced after the reel clutch C2 is switched to the connecting state is LT1+LT2, i.e., greater than the driving torque DT. Accordingly, even if the heating roller 61 separates from the multilayer film F after the reel clutch C2 is switched to the connecting state, the greater loading torque LT serves to restrain the take-up reel 35 from rotating, with the result that the multilayer film F is not conveyed but keeps stopping under a predetermined tension.

The process steps S10 and S11 correspond to a post-transfer restraining process to cause the releasable restraining device to switch to the restraining state within a period of time after the toner area TA goes past the layer transfer position before the trailing edge of the sheet S reaches the downstream conveyor roller 12A. The post-transfer restraining process in steps S10 and S11 may be executed based on the time (time t11) of detection of the trailing edge of the sheet S by the first sheet sensor SS1. The process steps S10 and S11 may be executed based on the time (time t5) of detection of the leading edge of the sheet S, but execution of the process steps S10 and S11 based on the time t11 of detection of the trailing edge of the sheet S may be better in view of precise timing control because the time t11 of detection of the trailing edge of the sheet S is closer to the time of execution of the process steps S10 and S11.

After step S11, the controller 300 turns the heater off (step S12, time t16). After step S12, the controller 300 turns the main motor 80 off (step S13, time t17). After step S13, the controller 300 switches the reel clutch C2 to the disconnecting state (step S14, time t18), and brings the entire area transfer process to an end. The process steps S12 to S14 may be executed based on the time (time t15) of detection of the trailing edge of the sheet S by the second sheet sensor SS2.

Figure 13:
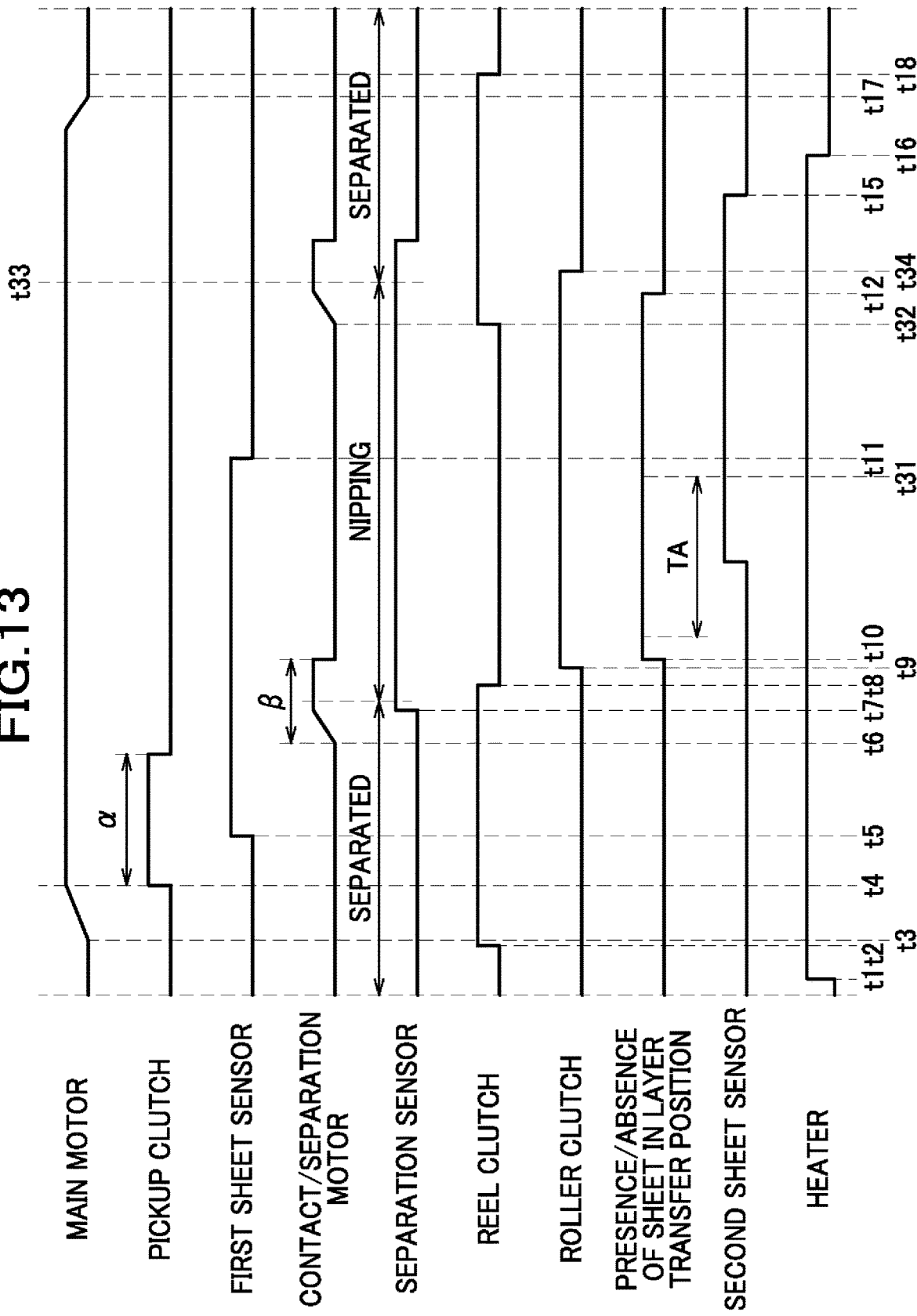
FIG. 13 is a timing chart showing timings of sequential operations of relevant components as timed for the forward area transfer process.

Next, referring to FIG. 10 and FIG. 13, the forward area transfer process will be described below. The forward area transfer process is different only in part of a post-transfer process from the entire area transfer process, and the other part of process steps is substantially the same as that of the entire area transfer process; therefore the same process steps may be designated by the same reference characters, and a duplicate description thereof will be omitted.

Figure 10:
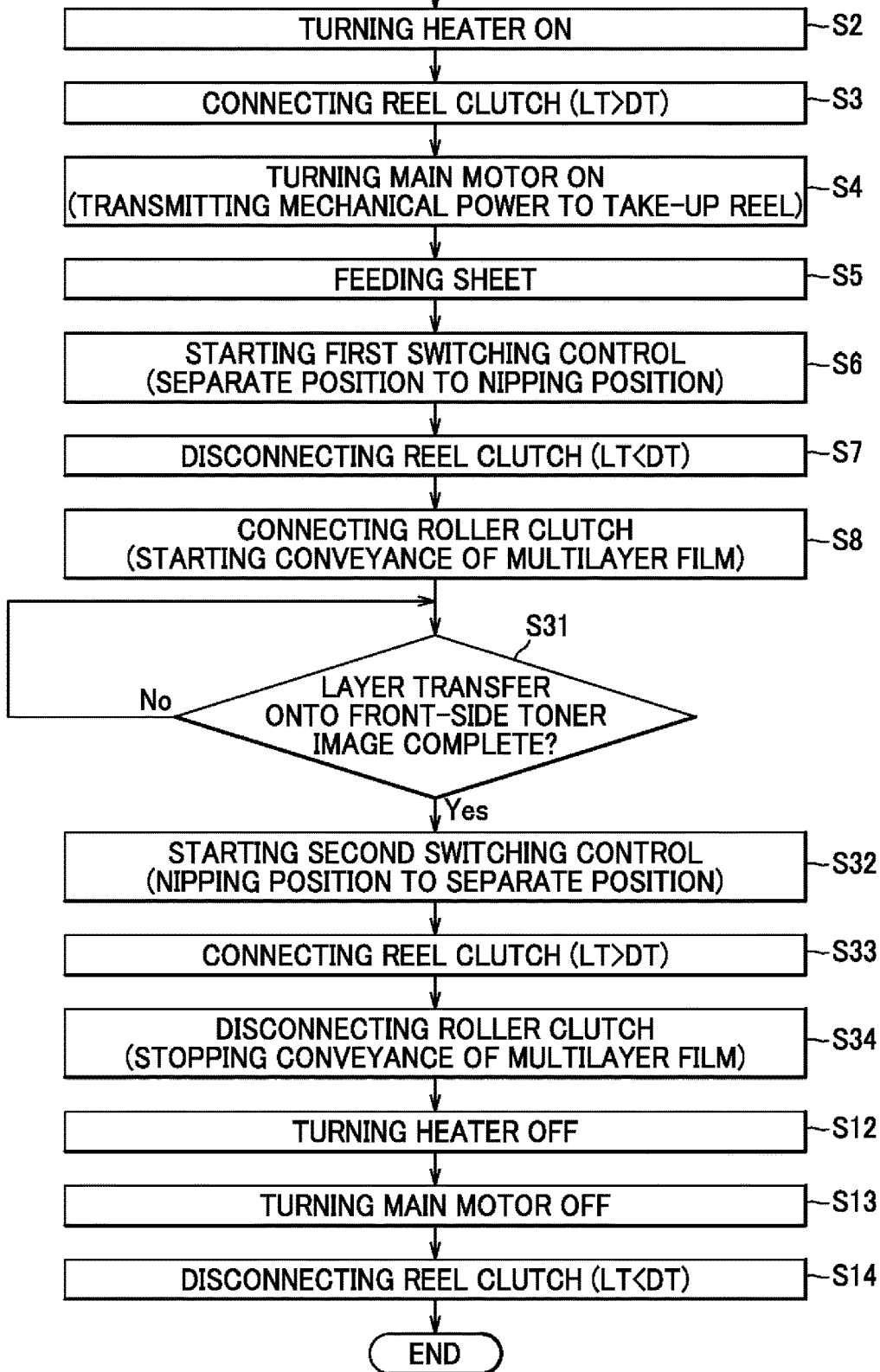
FIG. 10 is a flowchart showing the forward area transfer process.

In the forward area transfer process shown in FIG. 10, after completion of the process in steps S1 to S8, the controller 300 makes a determination as to whether or not a layer transfer onto a toner image in a toner area TA located on a front side with respect to the center of the sheet S in the direction of conveyance of the sheet S is complete (S31). Hereupon, the determination as to whether or not the layer transfer onto the toner image is complete may be made based on a time of detection of the leading edge of the sheet S by the first sheet sensor SS1, more specifically, a time elapsed from the time of detection of the leading edge of the sheet S. In the present embodiment, the time of completion of the layer transfer as determined may be a point in time before the trailing edge of the sheet S reaches the layer transfer position, for example, a point in time at which the center of the sheet S in the direction of conveyance of the sheet S reaches the layer transfer position.

If it is determined in step S31 that the layer transfer is complete (Yes), then the controller 300 starts the post-transfer restraining process as shown in steps S32 to S34. To be more specific, in step S32, the controller 300 starts the second switching control to move the heating roller 61 from the nipping position to the separate position (S32). More specifically, the controller 300 starts causing the switching mechanism 70 to switch the state of the heating roller 61 and the pressure roller 51 from the nip state to the nip release state at a time (time t32) after the toner area TA goes past the layer transfer position (after time t31) before the trailing edge of the sheet S goes past the layer transfer position (before time t12).

After step S32, specifically, for a time period from the time at which the switching from the nip state to the nip release state is started to the time at which the nip release state is achieved (between times t32 to t33), the controller 300 switches the reel clutch C2 to the connecting state to make LT>DT (S33). In the present embodiment, the process steps S31 and S32 are executed substantially simultaneously.

After step S33, the controller 300 switches the roller clutch C5 to the disconnecting state to stop rotation of the pressure roller 51, and thereby stops conveyance of the multilayer film F (step S34, time t34). After the post-transfer restraining process shown in steps S32 to S34, the controller 300 executes the process steps S12 to S14, and brings the forward area transfer process to an end. In other words, after the post-transfer restraining process, the controller 300 stops the main motor 80 (S13).

Figure 14:
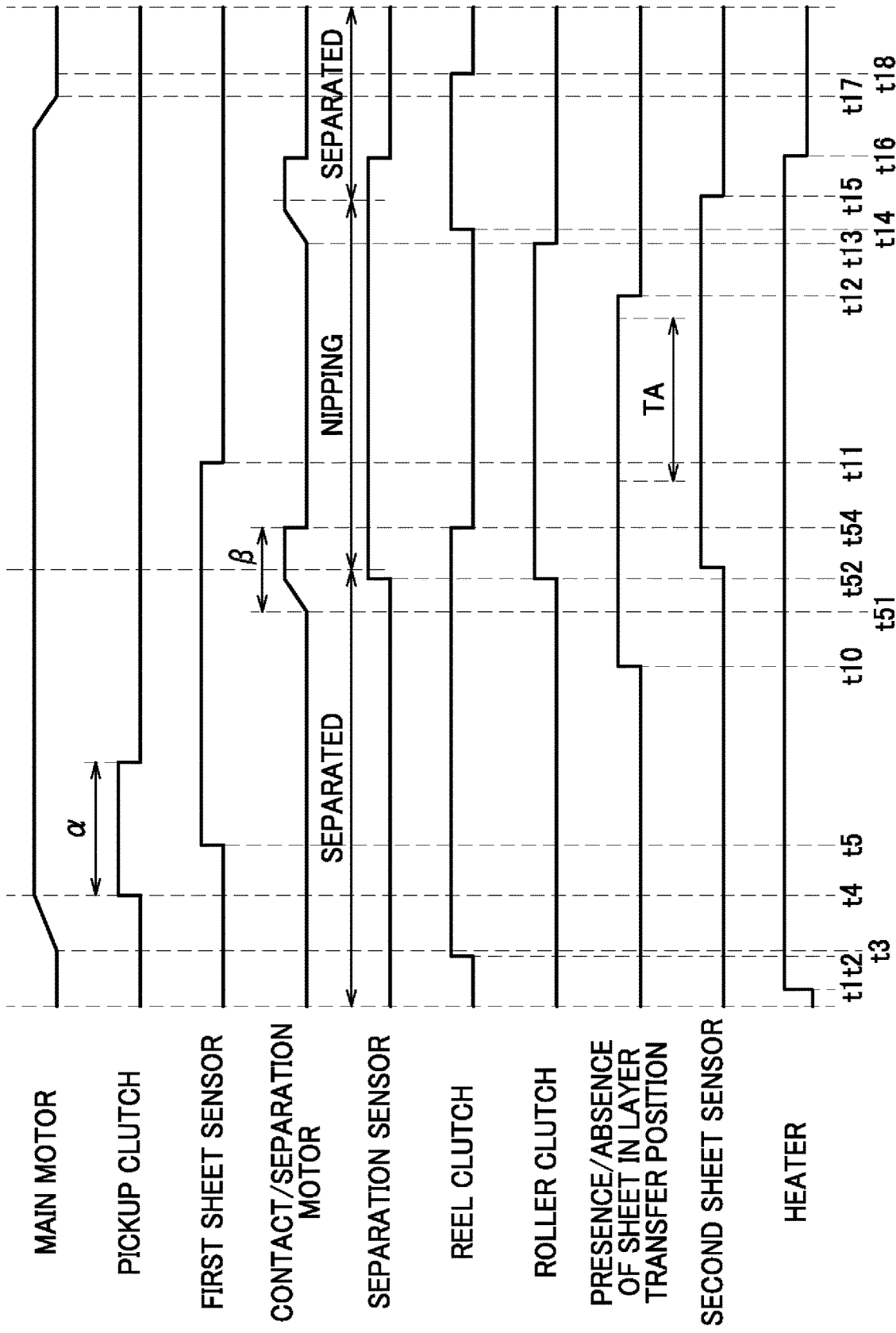
FIG. 14 is a timing chart showing timings of sequential operations of relevant components as timed for the rearward area transfer process.

Next, referring to FIG. 11 and FIG. 14, the rearward area transfer process will be described below. The rearward area transfer process is different only in part of a pre-transfer process from the entire area transfer process, and the other part of process steps is substantially the same as that of the entire area transfer process; therefore the same process steps may be designated by the same reference characters, and a duplicate description thereof will be omitted.

Figure 11:
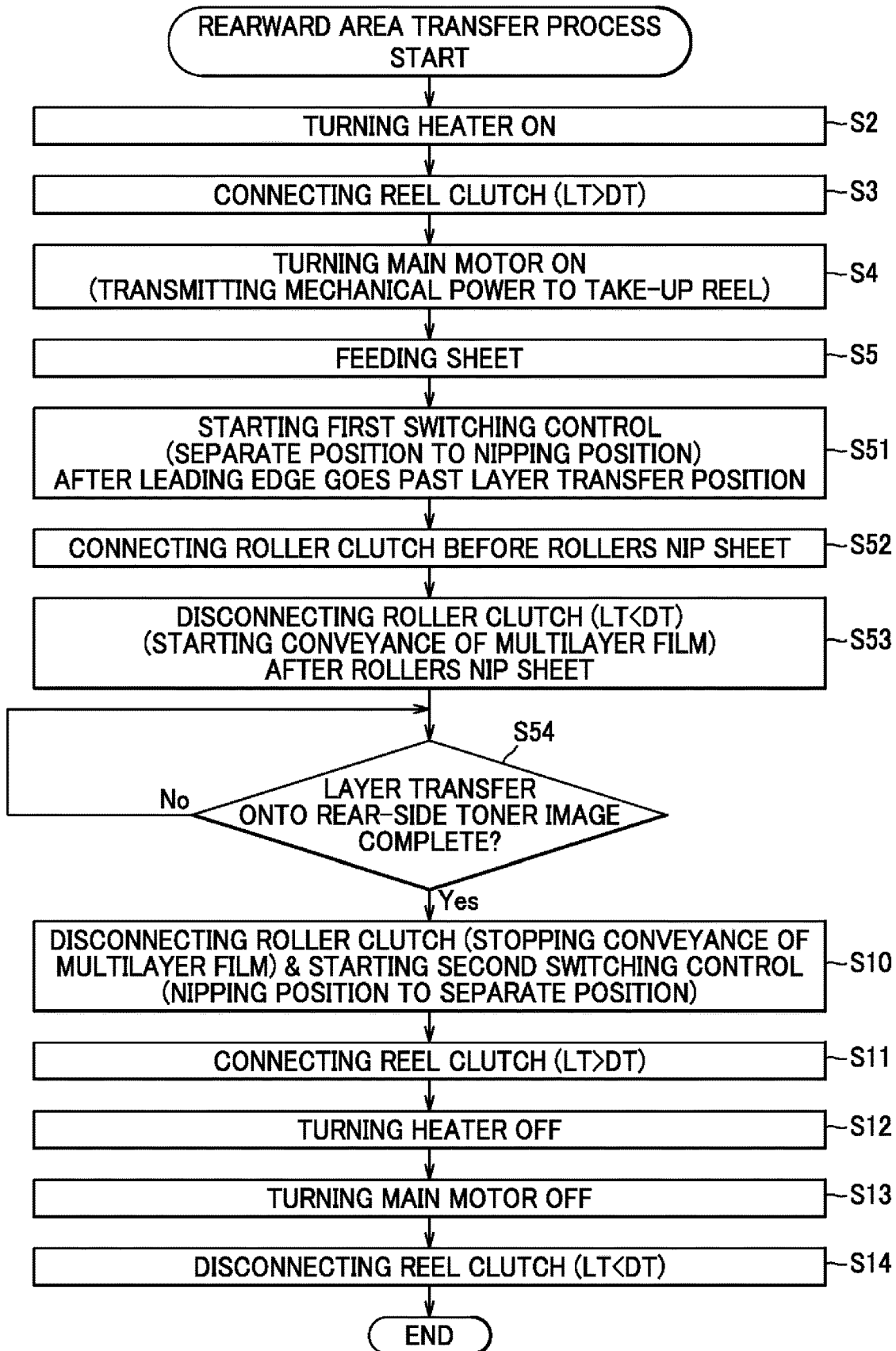
FIG. 11 is a flowchart showing the rearward area transfer process.

In the rearward area transfer process shown in FIG. 11, after completion of the process in steps S1 to S5, the controller 300 starts the first switching control to move the heating roller 61 from the separate position to the nipping position (S51). To be more specific, the controller 300 starts causing the switching mechanism 70 to switch the state of the pressure roller 51 and the heating roller 61 from the nip release state to the nip state (at time t51) after the leading edge of the sheet S goes past the layer transfer position (after time t10). That is, the controller 300 executes the restraint release process shown in steps S51 to S53 after the leading edge of the sheet S goes past the layer transfer position.

After step S51, the controller 300 switches the roller clutch C5 to the connecting state to cause the pressure roller 51 to rotate (S52). Specifically, in step S52, the controller 300 causes the roller clutch C5 to switch from the disconnecting state (shut-off state) to the connecting state (transmitting state) at a time (time t52) before the heating roller 61 and the pressure roller 51 start nipping the multi-layer film F and the sheet S. To be more specific, the controller 300 causes the roller clutch C5 to switch from the disconnecting state to the connecting state in response to the change in the output of the separation sensor SA.

After step S52, the controller 300 switches the reel clutch C2 to the disconnecting state to make LT<DT (S53). Specifically, the controller 300 makes LT<DT at a time (time t54) after a time (after time t53) at which the heating roller 61 and the pressure roller 51 nips the multilayer film F and the sheet S. More specifically, the controller 300 makes LT<DT in response to the change in the output of the separation sensor SA.

After step S53, the controller 300 makes a determination as to whether or not a layer transfer onto a toner image in a toner area TA located on a rear side with respect to the center of the sheet S in the direction of conveyance of the sheet S is complete (S54). It is to be understood that the determination as to whether or not the layer transfer is complete may be made in a manner similar to that in which the corresponding determination is made in the entire area transfer process.

If it is determined in step S54 that the layer transfer is complete (Yes), then the controller 300 executes the process steps S10 to S14, and brings the rearward area transfer process to an end.

According to the present embodiment, the following advantageous effects can be achieved.

Since the multilayer film F is restrained from being drawn out from the supply reel 31 by the releasable restraining device if the toner area AT is not present between the heating roller 61 and the pressure roller 51, the multilayer film F is restrained from being conveyed uselessly.

Since the main motor 80 is caused to generate mechanical power when the releasable restraining device is in the restraining state, the multilayer film F can be restrained from being conveyed uselessly, effectively in comparison, for example, with an alternative configuration in which the main motor 80 is caused to generate mechanical power when the releasable restraining device is in the release state.

Since the releasable restraining device is caused to switch to the release state within a period of time after the leading edge of the sheet S goes past the upstream conveyor roller 11C before the toner area TA reaches the layer transfer position, the multilayer film F can be restrained from being conveyed uselessly, effectively in comparison, for example, with an alternative configuration in which the releasable restraining device is caused to switch to the release state before the leading edge of the sheet goes past the upstream conveyor roller.

Since the releasable restraining device is caused to switch to the release state after the leading edge of the sheet S goes past the layer transfer position, the multilayer film F can be restrained from being conveyed uselessly, effectively in comparison, for example, with an alternative configuration in which the releasable restraining device is caused to switch to the release state before the leading edge of the sheet goes past the layer transfer position.

Since the releasable restraining device is caused to switch to the restraining state within a period of time after the toner area TA goes past the layer transfer position before the trailing edge of the sheet S reaches the downstream conveyor roller 12A, the multilayer film F can be restrained from being conveyed uselessly, effectively in comparison, for example, with an alternative configuration in which such a post-transfer restraining process is executed after the trailing edge of the sheet goes past the downstream conveyor roller.

Since the controller 300 executing the forward area transfer process is configured to cause the releasable restraining device to switch to the restraining state before the trailing edge of the sheet S reaches the layer transfer position, the multilayer film F can be restrained from being conveyed uselessly, effectively in comparison, for example, with an alternative configuration in which the releasable restraining device is switched to the restraining state after the trailing edge of the sheet S goes past the layer transfer position.

In the forward area transfer process, for example if the post-transfer restraining process is started (at time t32) based on the time of detection of the trailing edge of the sheet (time t11 in FIG. 13), the post-transfer restraining process cannot be started until the time of detection of the trailing edge of the sheet S which comes after the toner area TA goes past the layer transfer position; this would involve a delay of the start of the post-transfer restraining process. In contrast, with the configuration described above, the time (time t32) to start the post-transfer restraining process is determined based on the time of detection of the leading edge of the sheet S (time t5), and thus the post-transfer process can be started, for example, immediately after the toner area TA goes past the layer transfer position, with the result that the multilayer film F can be restrained from being conveyed uselessly.

In the rearward area transfer process, the trailing edge of the sheet S is detected at a time (time t11) before the time (before time t12) at which the toner area TA finally goes past the toner area TA; therefore, the post-transfer restraining process can be executed timely based on the time of detection of the trailing edge of the sheet S. Also, a period of time required to start the post-transfer restraining process after detection by the first sheet sensor SS1 in the rearward area transfer process can be shortened and an error in the start timing of the post-transfer restraining process can be restrained accordingly, in comparison, for example, with an alternative configuration in which the post-transfer restraining process is started based on the time of detection of the leading edge of the sheet.

Since the post-transfer restraining process is started after the toner area TA goes past the second guide shaft 42 as the separator roller, the multilayer film F can be peeled clean from the toner area TA, so that defective peeling can be restrained.

Since the main motor 80 is stopped after the post-transfer restraining process, the multilayer film F can be restrained from being conveyed uselessly, effectively in comparison, for example, with an alternative configuration in which the main motor 80 is stopped before the post transfer restraining process.

If the relationship between the loading torque LT and the driving torque DT is established to satisfy LT>DT and the pressure roller 51 is rotating, the switching mechanism 70 keeps the state of the heating roller 51 and the pressure roller 61 in the nip release state so that the heating roller 61 is separate from the multilayer film F; therefore, the multilayer film F can be restrained from being conveyed uselessly.

When the switching mechanism 70 keeps the state of the heating roller 61 and the pressure roller 51 in the nip state, the roller clutch C5 is in the disconnecting state so that the multilayer film F is not conveyed; therefore, the multilayer film F can be restrained from being conveyed uselessly.

In the forward area transfer process, for example if the roller clutch is switched from the disconnecting state to the connecting state before the heating roller and the pressure roller start nipping the multilayer film, the multilayer film would be conveyed to waste at an instance when the rollers start nipping the multilayer film. In contrast, the above-described configuration is such that in the forward area transfer process, the roller clutch is caused to switch from the disconnecting state to the connecting state after the heating roller 61 and the pressure roller 51 start nipping the multilayer film F; therefore, the multilayer film F can be restrained from being conveyed uselessly.

In the rearward area transfer process, for example if the heating roller and the pressure roller are stopped when the heating roller and the pressure roller start nipping the multilayer film and the sheet, the rollers thus kept immobile resist conveyance of the sheet. In contrast, the above-described configuration is such that in the rearward area transfer process, the heating roller 61 and the pressure roller 51 are caused to rotate before the rollers 61, 51 start nipping the multilayer film F and the sheet S; therefore, the sheet S can be conveyed smoothly.

In the forward area transfer process, for example if the roller clutch is switched to the disconnecting state before switching from the nip state to the nip release state is started, the rollers are stopped while the sheet and the multilayer film are nipped between the rollers, so that the rollers thus kept immobile resist conveyance of the sheet. In contrast, the forward area transfer process according to the present embodiment is configured such that the roller clutch C5 is switched to the disconnecting state after the switching from the nip state to the nip release state is started; therefore, the rollers 61, 51 are restrained from resisting the conveyance of the sheet S, so that the sheet S can be conveyed smoothly.

The loading torque LT can be made greater than the driving torque DT to stop conveyance of the multilayer film F. The loading torque LT can be made smaller than the driving torque DT to smoothly convey the sheet S and the multilayer film F.

Since the loading torque LT is changed to establish such a relationship between the loading torque LT and the driving torque DT as satisfying LT>DT, within a period of time after switching from the nip state to the nip release state is started before the state of the rollers is switched to the nip release state, the event of stopping the multilayer film F can be timed to occur earlier in comparison, for example with an alternative configuration in which the relationship between the loading torque LT and the driving torque DT is changed to satisfy LT>DT after the switching mechanism has switched the state of the rollers to the nip release state. Therefore, the multilayer film F can be restrained from being conveyed uselessly.

In the forward area transfer process, for example, when the heating roller and the pressure roller are caused to rotate before the heating roller and the pressure roller start nipping the multilayer film and the sheet so as not to stop conveyance of the sheet, the loading torque may be made smaller than the driving torque before the heating roller and the pressure roller start nipping the multilayer film and the sheet, but the conveyance of the multilayer film and the sheet caused to start at an instance when the rollers start nipping the multilayer film and the sheet would entail useless conveyance of the multilayer sheet, and part of the multilayer sheet would disadvantageously run to waste. In contrast, the above-described illustrative configuration proposes to make the loading torque LT smaller than the driving torque DT after the rollers 61, 51 nip the multilayer film F and the sheet S, so that useless conveyance of the multilayer film as mentioned above can be restrained effectively.

On the other hand, for example, if the loading torque is made greater than the driving torque after the switching mechanism switches the state of the rollers to the nip release state, the multilayer film conveyed for a period of time after the roller separates the multilayer film before the loading torque is made greater than the driving torque would run to waste. In contrast, the above-described illustrative configuration proposes to make the loading torque LT greater than the driving torque DT before the switching mechanism 70 switches the state of the rollers to the nip release state, specifically, before the heating roller 61 is caused to separate from the multilayer film F, so that useless conveyance of the multilayer film F can be restrained effectively.

Since the mechanical force generated by the main motor 80 is transmitted to the pressure roller 51, the structure can be simplified in comparison, for example, with an alternative configuration in which the main motor is connected to the heating roller that is to be moved.

The above-described illustrative, non-limiting embodiment may be modified and implemented in various other forms as will be described below. In the following description, the same structural elements as those described above will be designated by the same reference characters and a duplicated description will be omitted.

Although the layer transfer device 1 described above is configured as an independent device separate from an image forming apparatus such as a laser printer, the layer transfer device 1 may alternatively be configured as an integral unit combined with a laser printer PT that is an image forming apparatus.

Figure 15:
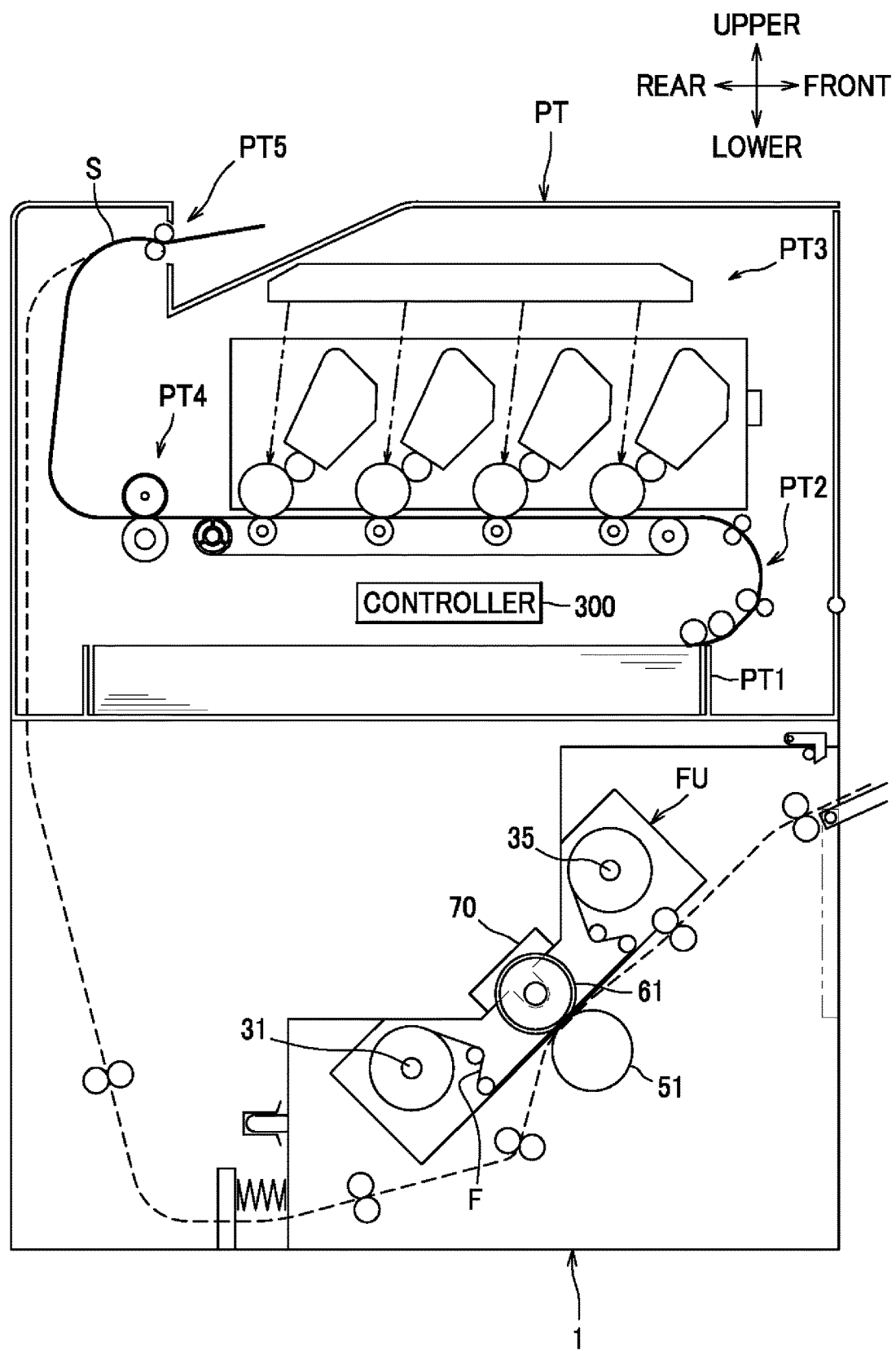
FIG. 15 shows a first modified example of the device.

As shown in FIG. 15, the laser printer PT includes a sheet tray PT1, a sheet feeder unit PT2, an image forming unit PT3, a fixing unit PT4, and a sheet conveyor mechanism PT5. The sheet tray PT1 is configured to hold sheets S in a stack. The sheet feeder unit PT2 is configured to feed a sheet S from a stack of sheets held in the sheet tray PT1 to the image forming unit PT3. The image forming unit PT3 is configured to form a toner image on the sheet fed from the sheet feeder unit PT2. The fixing unit PT4 is configured to fix the toner image onto the sheet S. The sheet conveyor mechanism PT5 is configured to convey the sheet S with the toner image fixed thereon either to the outside of the laser printer PT or to the layer transfer device 1.

The layer transfer device 1 is configured to have structural features similar to those of the above-described embodiment, and includes a film unit FU, a pressure roller 51, a heating roller 61, and a switching mechanism 70. The layer transfer device 1 has the same configuration as that shown schematically in FIG. 6.

Figure 16:
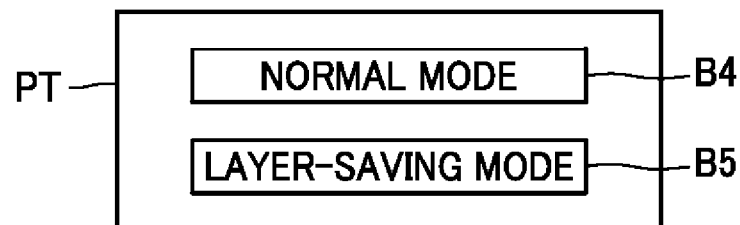
FIG. 16 shows a touch panel in the first modified example.

The laser printer PT includes a touch panel TP as shown in FIG. 16. The touch panel TP is a panel that displays various buttons including a normal button B4 for execution of a layer transfer process in a normal mode and a layer-saving button B5 for execution of the layer transfer process in a layer-saving mode. A user can choose either of the modes by touching a corresponding button chosen from the buttons B4, B5 displayed on the touch panel TP. If the user touches the normal button B4, then the touch panel TP outputs to the controller 300 an instruction to execute the layer transfer process in the normal mode chosen by the user. If the user touches the layer-saving button B5, then the touch panel TP outputs to the controller 300 an instruction to execute the layer transfer process in the layer-saving mode chosen by the user.

Herein, the normal mode is a mode as shown in FIG. 17A for executing a normal process in which when a transfer layer F22 is transferred onto a toner image formed on a sheet S having a predetermined length in the direction of conveyance of the sheet S and a toner-image formable area defined within limits of the predetermined length, a layer conveyance time for which the switching mechanism 70 is keeping the state of the heating roller 61 and the pressure roller 51 in the nip state is a first length in time T1 equal to or longer than a period of time required for the entire toner-image formable area of the sheet S to go past the layer transfer position. In the present embodiment, the first length in time T1 is longer than a period of time Ta required for the sheet S to go past the layer transfer position.

The layer-saving mode is a mode as shown in FIG. 17B for executing a layer-saving process in which the layer conveyance time mentioned above is a second length in time T2 shorter than the first length in time T1. The layer-saving process is a process in which when a first toner area having a toner image formed therein, a no-toner area having no toner image formed therein, and a second toner area having another toner image formed therein successively go past the layer transfer position in this sequence, the switching mechanism 70 is caused to keep the state of the heating roller 61 and the pressure roller 51 in the nip state at least throughout a period of time for which the first toner area is going past the layer transfer position, the switching mechanism 70 is then caused to switch the state of the heating roller 61 and the pressure roller 51 to the nip release state after the first toner area goes past the layer transfer position, and the switching mechanism 70 is further caused to keep the state of the heating roller 61 and the pressure roller 51 in the nip state at least throughout a period of time for which the second toner area is going past the layer transfer position.

FIG. 17B shows an example of the process executed in the layer-saving mode for a sheet S having two toner areas TA formed in positions apart from each other in the direction of conveyance of the sheet S. In this example, the switching mechanism 70 is configured to keep the state of the heating roller 61 and the pressure roller 51 in the nip state only during the period of time T21 (having the length in time T2) for which the first toner area TA is going past the layer transfer position and the period of time T22 (having the length in time T2) for which the second toner area TA is going past the layer transfer position. Therefore, in this example of the layer-saving process, the second length in time T2 as the layer conveyance time is the total length of the period of time T21 and the period of time T22 (T2=T21+T22).

When the layer transfer process is executed successively on a plurality of sheets S (this process will be hereinafter referred to as "successive transfer process"), in the normal mode as shown in FIG. 18A, the switching mechanism 70 is caused to keep the state of the heating roller 61 and the pressure roller 51 in the nip state throughout a period of time from a point in time at which the first sheet S reaches the layer transfer position until a point in time at which the last sheet S goes past the layer transfer position. Herein, the successive transfer process refers to a layer transfer process successively executed on a plurality of sheets S conveyed at predetermined intervals.

When the successive transfer process is executed in the layer-saving mode as shown in FIG. 18B, the switching device 70 is caused to keep the state of the heating roller 61 and the pressure roller 51 in the nip state, only during a period of time for which the toner area TA on each sheet S is going past the layer transfer position. FIG. 18B shows an example of the process in the layer-saving mode as executed when a toner area TA is defined over the entire image forming area of each sheet S.

Next, a description of the operation of the controller 300 will be given in detail. When the laser printer PT is powered on, the controller 300 repeatedly executes a process shown in FIG. 19.

Figure 19:
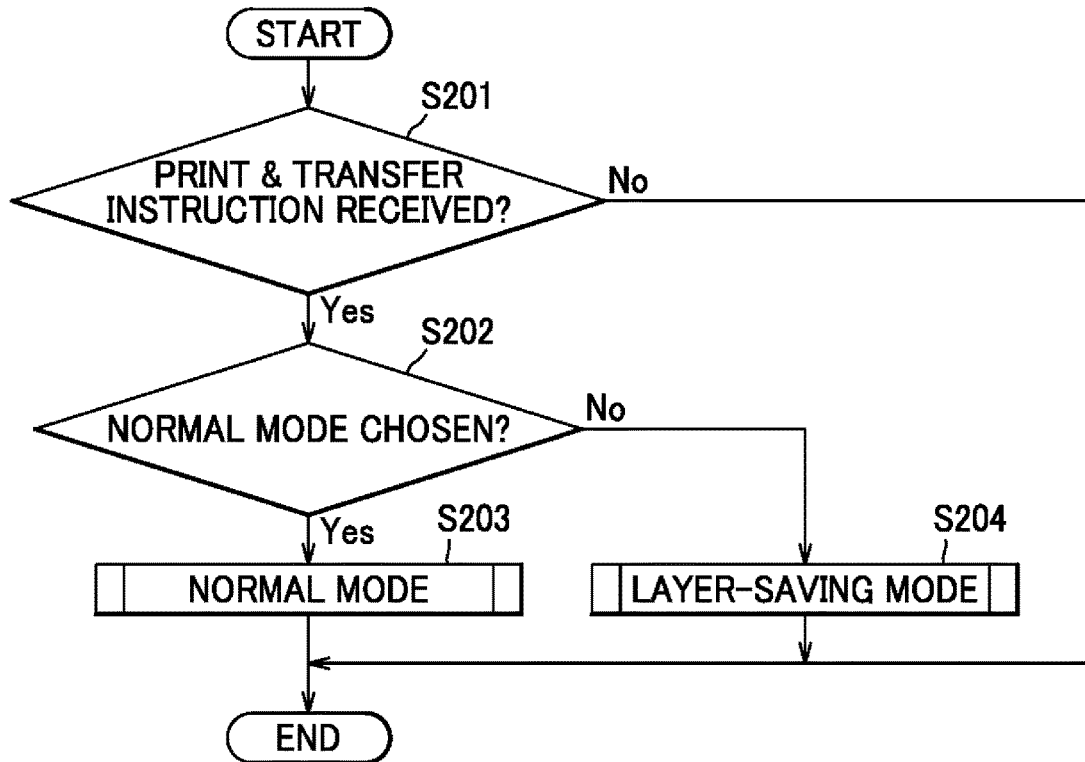
FIG. 19 is a flowchart showing a process of operation of a controller in the first modified example.

In the process shown in FIG. 19, the controller 300, first, makes a determination as to whether or not a print-and-transfer instruction has been received (S201). The print-and-transfer instruction refers to an instruction for executing a printing process on a sheet S or sheets S in the laser printer PT, conveying the sheet(s) S to the layer transfer device 1, and executing a layer transfer process on the sheet(s) S in the layer transfer device 1. If it is determined in step S201 that the print-and-transfer instruction has not been received (No), then the controller 300 brings this round of the process to an end.

If it is determined in step S201 that the print-and-transfer instruction has been received (Yes), then the controller 300 makes a determination based on a signal from the touch panel TP as to whether or not the normal mode has been chosen (S202). Meanwhile, upon receipt of the print-and-transfer instruction, the controller 300 executes a known printing process to form a toner image on the sheet(s) S, and conveys the sheet(s) having the toner image formed thereon to the layer transfer device 1.

If it is determined in step S202 that the normal mode has been chosen (Yes), then the controller 300 proceeds to execute the process in the normal mode (S203). On the other hand, if it is determined in step S202 that the normal mode has not been chosen (No), then the controller 300 determines that the layer-saving mode has been chosen, and proceeds to execute the process in the layer-saving mode (S204).

Figure 20:
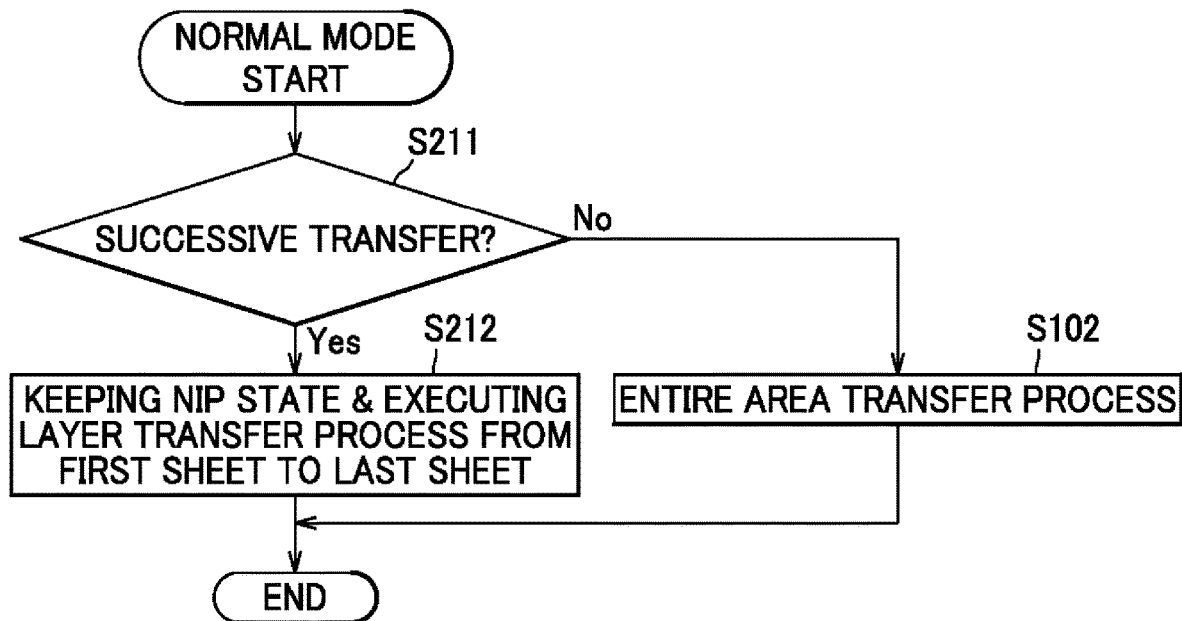
FIG. 20 is a flowchart showing a process executed in the normal mode.

In the normal mode process shown in FIG. 20, the controller 300 makes a determination as to whether or not a successive transfer process is to be executed, i.e., whether or not the received print-and-transfer instruction is an instruction to execute a process of printing and layer transfer on a plurality of sheets S (S211). If it is determined in step S211 that the successive transfer process is not to be executed (No), then the controller 300 proceeds to execute the entire area transfer process (S102), which is similar to the process as in the above-described embodiment (see the process shown in FIG. 9).

If it is determined in step S211 that the successive transfer process is to be executed (Yes), then the controller 300 causes the switching mechanism 70 to keep the state of the heating roller 61 and the pressure roller 51 in the nip state throughout a period of time from a point in time at which the first sheet S reaches the layer transfer position until a point in time at which the last sheet goes past the layer transfer position (S212). It is to be understood that the timing of causing the switching mechanism 70 to switch the state of the heating roller 61 and the pressure roller 51 from the nip release state to the nip state in step S212 may be the same as the timing of the corresponding step in the pre-transfer process in the entire area transfer mode. Similarly, the timing of causing the switching mechanism 70 to switch the state of the heating roller 61 and the pressure roller 51 from the nip state to the nip release state may be the same as the timing of the corresponding step in the post-transfer process of the entire area transfer mode.

To be more specific, for a period of time until the first sheet S reaches the layer transfer position, the controller 300 executes the above-described steps S2 to S8. After step S8, the controller 300 waits, remaining idle, until the last sheet S goes past the layer transfer position. After the last sheet S goes past the layer transfer position, the controller 300 executes the above-described steps S10 to S14.

Figure 21:
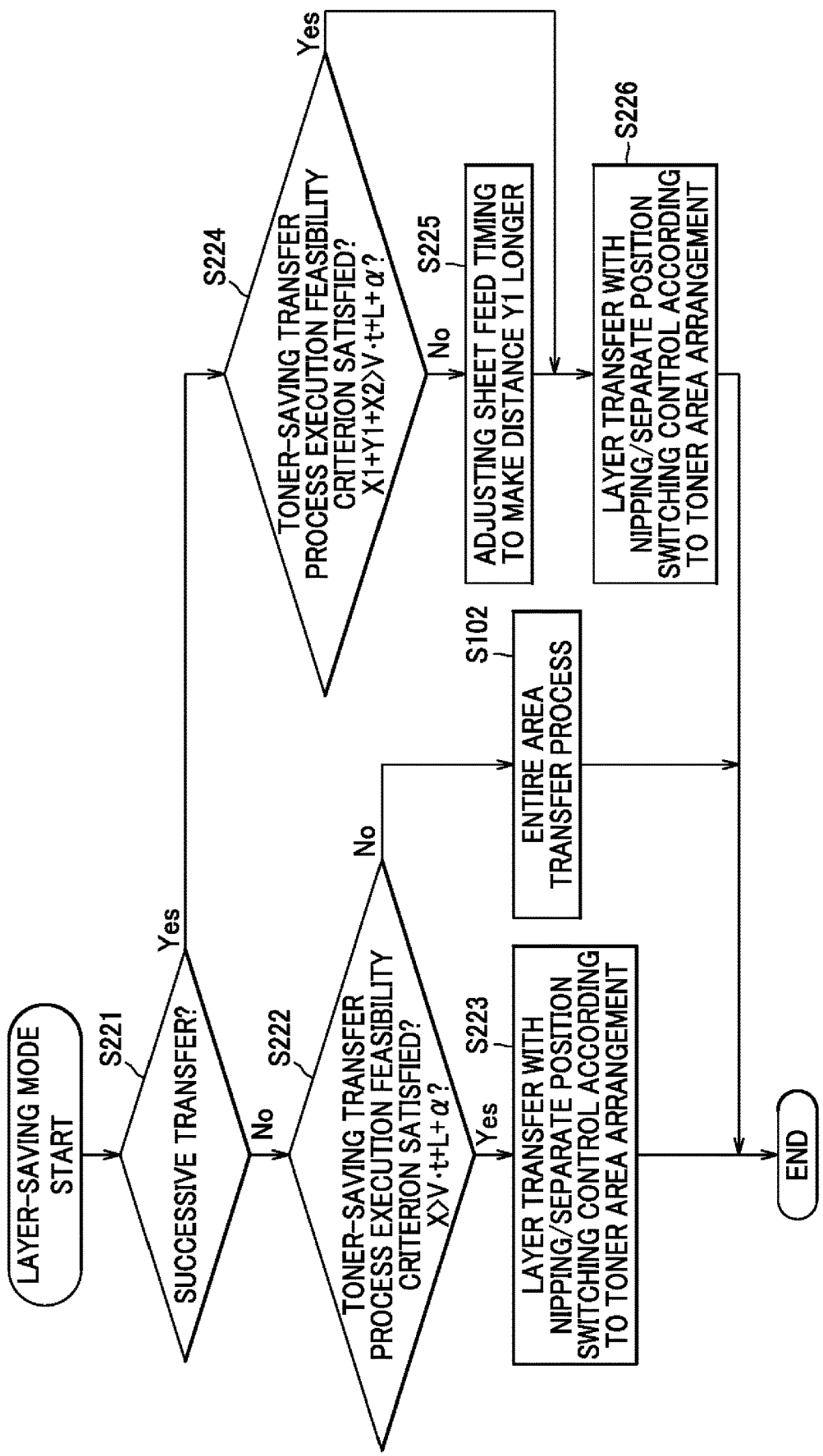
FIG. 21 is a flowchart showing a process executed in the layer-saving mode.

Next, referring to FIG. 21, the layer-saving mode will be described below. For the process in the layer-saving mode, the controller 300 is configured to set a toner area having a toner image formed therein and a no-toner area having no toner image formed therein, based on information on images included in the print-and-transfer instruction. Specifically, for example, if it is confirmed that a specified first range in a sheet S in the direction of conveyance of the sheet S is a region in which a toner image is to be formed, then the controller 300 sets this first range as a first toner area. Similarly, if it is confirmed that a second range located apart from the first range in the direction of conveyance of the sheet S is another region in which a toner image is to be formed, then the controller 300 sets this second range as a second toner area. Furthermore, if it is confirmed that a third range between the first range and the second range in the direction of conveyance of the sheet S is a region in which no toner image is to be formed, then the controller 300 sets this third range as a no-toner area.

The controller 300 executing a process in the layer-saving mode, first, makes a determination as to whether or not a successive transfer process is to be executed (S221). If it is determined in step S221 that the successive transfer process is not to be executed (No), then the controller 300 makes a determination as to whether or not a feasibility criterion for judging feasibility of execution of the layer-saving transfer process for a single sheet S is satisfied (S222).

Specifically, in step S222, the controller 300 makes a determination as to whether or not the following formula (1) is satisfied:

$$X > V \times t + L + \alpha \tag{1}$$

where X is a length of the no-toner area in the direction of conveyance of the sheet S;

V is a sheet conveyance velocity;

t is a shortest period of time required to cause the state of the heating roller 61 and the pressure roller 51 to be switched from the nip state to the nip release state and then back to the nip state;

L is a distance from the layer transfer position to the second guide shaft 42; and α is variation factor (including variations in the velocity, variations in the distance, and variations in timings of nipping and separation of the heating roller 61, due to dimensional tolerance of parts).

If it is determined in step S222 that the feasibility criterion is satisfied (Yes), then the controller 300 proceeds to execute the layer-saving transfer process (S223). If it is determined in step S222 that the feasibility criterion is not satisfied (No), then the controller 300 proceeds to execute the above-described entire area transfer process (S102; see the process shown in FIG. 9).

If it is determined in step S221 that the successive transfer process is to be executed (Yes), then the controller 300 makes a determination as to whether or not a feasibility criterion for judging feasibility of execution of the layer-saving transfer process in the successive transfer process is satisfied (S224). Specifically, in step S224, the controller 300 computes X in the formula (1) by the following formula (2):

$$X = X1 + Y1 + X2 \tag{2}$$

where X1 is a length of a first no-toner area adjacent to the trailing edge of a first sheet in the direction of conveyance;

X2 is a length of a second no-toner area adjacent to the leading edge of a second sheet conveyed subsequent to the first sheet in the direction of conveyance;

Y1 is a distance between the first sheet and the second sheet.

If it is determined in step S224 that the feasibility criterion is satisfied (Yes), then the controller 300 proceeds to execute the layer-saving transfer process (S226). If it is determined in step S224 that the feasibility criterion is not satisfied (No), then the controller 300 executes an adjustment process, e.g., exercises control over the sheet conveyor unit 10 to make the distance Y1 between the first sheet and the second sheet longer (S225), and thereafter proceeds to execute the layer-saving transfer process (S226).

To be more specific, the controller 300 executing the adjustment process delays starting the conveyance of the second sheet (the timing of feeding the sheet S by the pickup roller 11A) to make the distance Y1 between the first sheet and the second sheet longer than the distance assumed if the feasibility criterion is satisfied. It is to be understood that in the adjustment process, the controller 300 may alternatively exercise control over the sheet conveyor unit 10 to make the sheet conveyance velocity V lower than if the feasibility criterion is satisfied.

With this configuration, the following advantageous effects can be achieved.

Since the process in the layer-saving mode is available, the multilayer film F can be restrained from being conveyed uselessly in comparison with an alternative configuration in which an option of the layer-saving mode is not offered and the process is to be executed in the normal mode.

Even when two separate toner areas are present in a single sheet S, the layer transfer process can be executed properly in the layer-saving mode so that the multilayer film F can be restrained from being conveyed uselessly.

Since the layer-saving transfer process for a single sheet S is executed on condition that the formula (1) is satisfied, the supporting layer F1 can be peeled clean from the transfer layer F22 transferred on the first toner area, and the transfer layer F22 can be transferred properly onto the second toner area by the nip state established without fail by the switching mechanism 70 before the second toner area reaches the layer transfer position.

Since the length of no-toner area is assumed to be X=X1+Y1+X2 in the layer transfer process executed successively for a plurality of sheets S, the layer-saving transfer process can be executed satisfactorily for the successively conveyed sheets, as well.

Since the layer transfer process executed successively for a plurality of sheets S in the layer-saving mode involves the adjustment process executed if the feasibility criterion is not satisfied, the layer-saving transfer process can be made executable with increased probability so that the chance of saving the layer can be improved.

Figure 22:
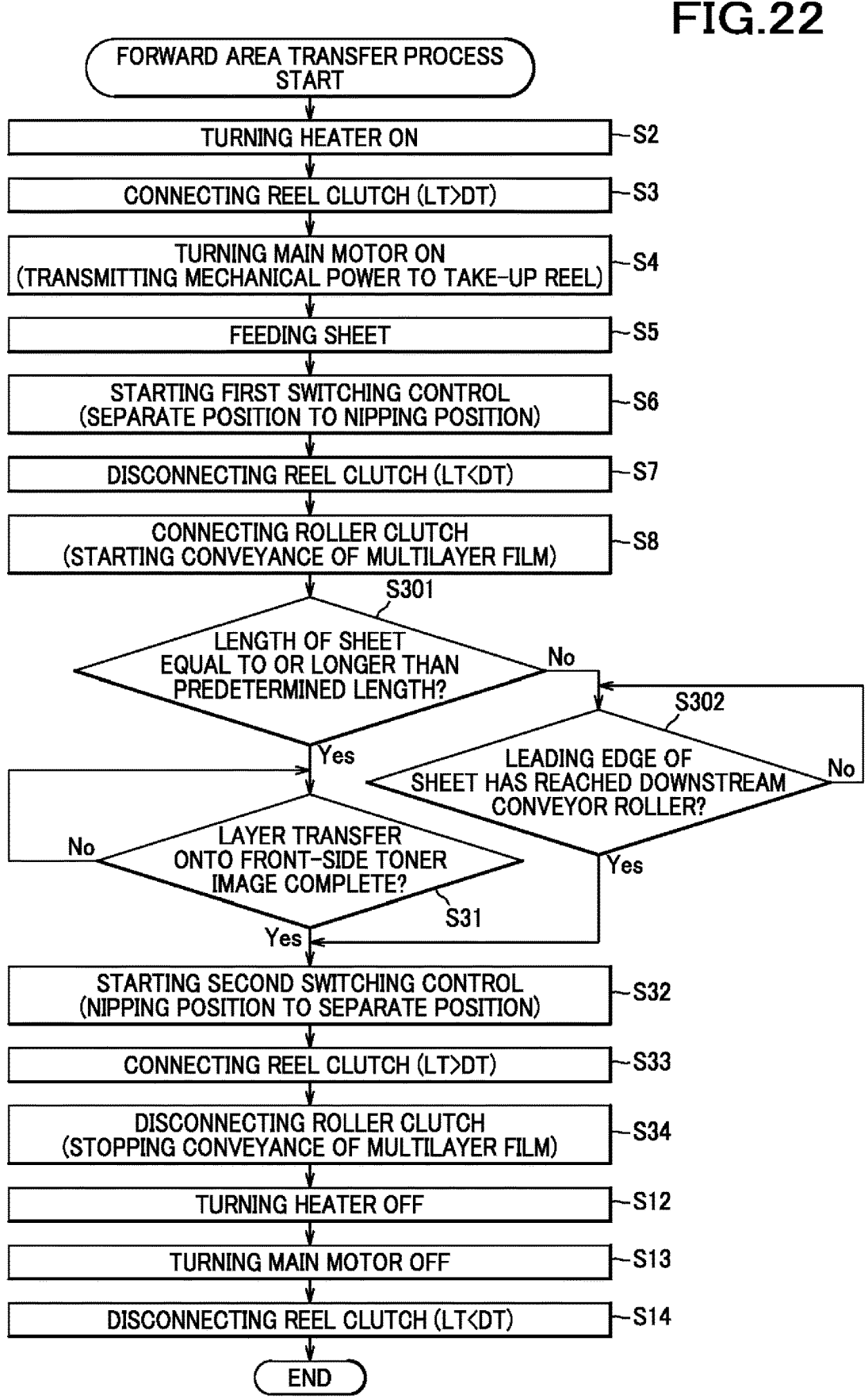
FIG. 22 is a flowchart showing a forward area transfer process executed by a controller in a second modified example.
Figure 23:
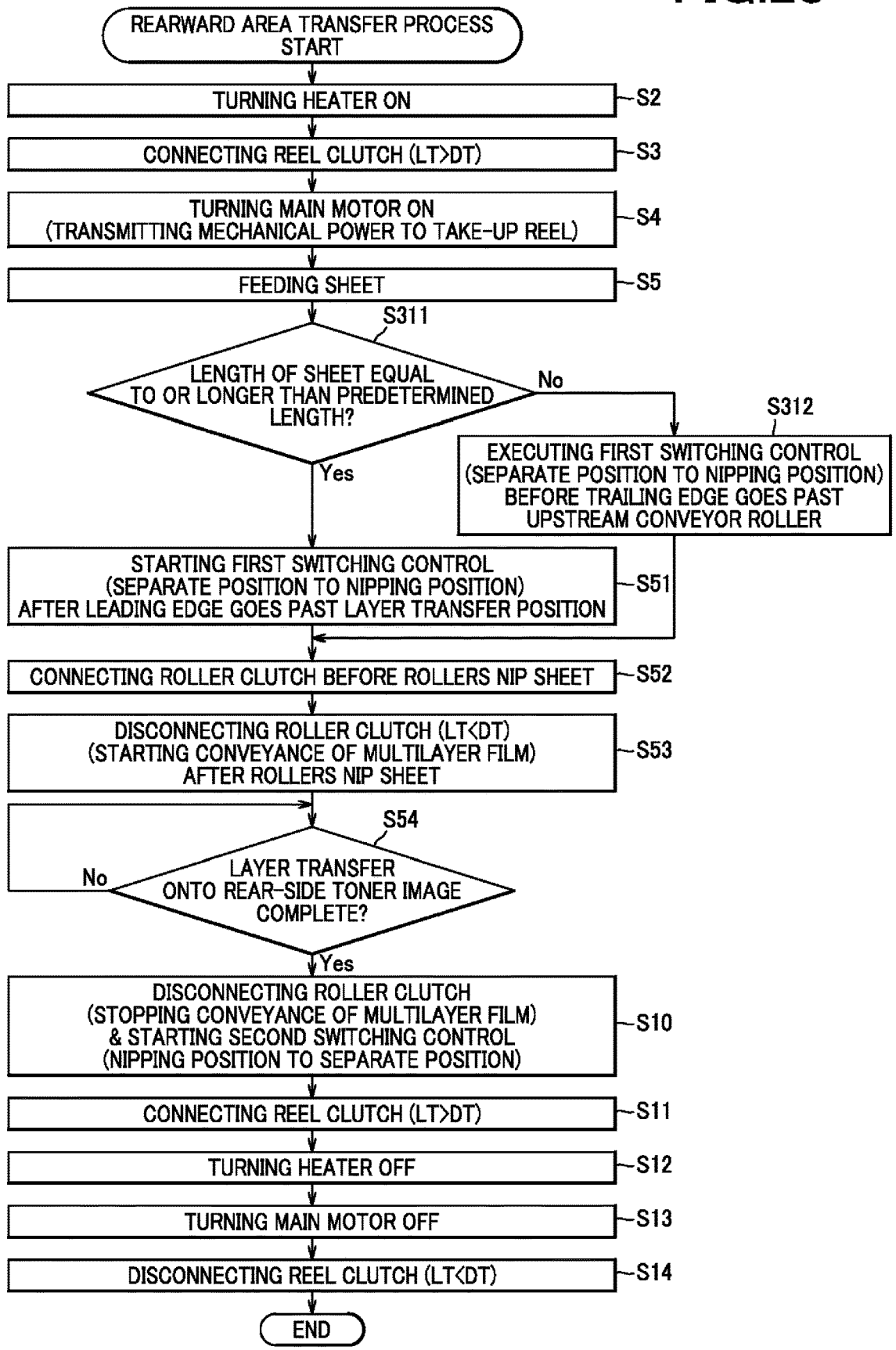
FIG. 23 is a flowchart showing a rearward arear transfer process executed by the controller in the second modified example.

It is to be understood that the layer-saving mode in which the controller 300 is configured to be implementable may include a forward area transfer mode in which a forward area transfer process shown in FIG. 22 is executed and a rearward area transfer mode in which a rearward area transfer process shown in FIG. 23 is executed. Herein, the forward area transfer process and the rearward area transfer process shown in FIG. 22 and FIG. 23 are processes contrived based on the above-described forward area transfer process and rearward area transfer process shown in FIG. 10 and FIG. 11, respectively, with some modified steps; therefore, the same process steps will be designated by the same reference characters and a duplicate description thereof will be omitted.

In the forward area transfer process shown in FIG. 22, the controller 300 executes the process steps S2 to S8 as described above, and then proceeds to make a determination as to whether or not a length of the sheet S in the direction of conveyance is a length equal to or longer than a predetermined length (S301). Herein, the predetermined length is a length equal to or longer than a roller pitch between (distance between rotation axes of) the upstream conveyor roller 11C and the downstream conveyor roller 12A.

If it is determined in step S301 that the length of the sheet S is equal to or longer than the predetermined length (Yes), then the controller 300 proceeds to execute the process steps S31 to S34 and S12 to S14. In other words, if the length of the sheet S in the direction of conveyance is equal to or longer than the predetermined length, the controller 300 causes the switching mechanism 70 to switch the state of the heating roller 61 and the pressure roller 51 to the nip release state at a point in time (when it turns out in step S31 that the layer transfer is complete) as described in the above-described embodiment, before the trailing edge of the sheet S goes past the layer transfer position (S32).

If it is determined in step S301 that the length of the sheet S is not longer than the predetermined length (No), then the controller 300 makes a determination as to whether or not the leading edge of the sheet S has reached the downstream conveyor roller 12A (S302). If it is determined in step S302 that the leading edge of the sheet S has reached the downstream conveyor roller 12A (Yes), then the controller 300 causes the switching mechanism 70 to switch the state of the heating roller 61 and the pressure roller 51 to the nip release state (S32). To be more specific, the point in time at which the controller 300 causes the switching mechanism 70 to switch the state of the heating roller 61 and the pressure roller 51 to the nip release state (S32) if it is determined that the length of the sheet S in the direction of conveyance is shorter than the predetermined length (No in step 301) is a point in time that comes after the leading edge of the sheet S has reached the downstream conveyor roller 12A and later than a point in time at which the controller 300 causes the switching mechanism 70 to switch the state of the heating roller 61 and the pressure roller 51 to the nip release state (S32) when it is determined that the length of the sheet S in the direction of conveyance is equal to or longer than the predetermined length (Yes in step 301).

In the rearward area transfer process shown in FIG. 23, the controller 300 executes the process steps S2 to S5 as described above, and then proceeds to make a determination as to whether or not the length of the sheet S in the direction of conveyance is a length equal to or longer than a predetermined length (S311). Herein, the predetermined length is the roller pitch between the upstream conveyor roller 11C and the downstream conveyor roller 12A.

If it is determined in step S311 that the length of the sheet S is equal to or longer than the predetermined length (Yes), then the controller 300 proceeds to execute the process steps S51 to S54 and S10 to S14. In other words, if the length of the sheet S in the direction of conveyance is equal to or longer than the predetermined length, the controller 300 causes the switching mechanism 70 to switch the state of the heating roller 61 and the pressure roller 51 to the nip release state at a predetermined point in time after the leading edge of the sheet S goes past the layer transfer position (S51).

If it is determined in step S311 that the length of the sheet S is shorter than the predetermined length (No), then the controller 300 causes the switching mechanism 70 to switch the state of the heating roller 61 and the pressure roller 51 to the nip state at a point in time before the trailing edge of the sheet S goes past the upstream conveyor roller 11C (S312). To be more specific, the point in time at which the controller 300 causes the switching mechanism 70 to switch the state of the heating roller 61 and the pressure roller 51 to the nip state (S312) if it is determined that the length of the sheet S in the direction of conveyance is shorter than the predetermined length (No in step S311) is a point in time that comes before the trailing edge of the sheet S goes past the upstream conveyor roller 11C and earlier than a point in time at which the controller 300 causes the switching mechanism 70 to switch the state of the heating roller 61 and the pressure roller 51 to the nip state (S51) when it is determined that the length of the sheet S in the direction of conveyance is equal to or longer than the predetermined length (Yes in S311). After step S312, the controller 300 proceeds to execute the process steps S32 to S54 and S10 to S14.

According to the present embodiment described above, the following advantageous effects can be achieved.

Since the forward area transfer process and the rearward area transfer process are executed in the layer-saving mode, the layer transfer process can be executed with layer-saving control according to the positions of the toner areas TA, so that the multilayer film F can be restrained from being conveyed uselessly.

The process step S312 executed in the rearward area transfer mode serves to restrain a small-size sheet fed by the upstream conveyor roller 11C from stopping; thus, small-size sheets can be conveyed smoothly.

Since the switching to the nip release state by the switching mechanism 70 in the forward area transfer mode is timed to take place when the determination in step S302 turns out to be Yes, a small-sized sheet S can be restrained from failing to be ejected from and remaining in the layer transfer device 1 by the switching to the nip release state before the leading edge of a small-size sheet S reaches the downstream conveyor roller 12A.

In the above-described embodiment, the switching mechanism 70 is configured to cause the heating roller 61 to be separated from the multilayer film F to achieve the nip release state; however, the state of the heating roller and the pressure roller may be switched from the nip state to the nip release state by causing the pressure roller to be separated from the multilayer film, or by causing both of the heating roller and the pressure roller to be separated from the multilayer film.

Furthermore, the heating roller and the pressure roller may be in contact with the multilayer film in the nip release state. In other words, the switching mechanism may be configured to switch the state of the heating roller and the pressure roller to a nip state in which a nip pressure between the heating roller and the pressure roller is set at a predetermined value and to a nip release state in which the nip pressure is set at a value less than the predetermined value.

With this alternative configuration, the weak nip pressure in the nip release state achieved by the switching mechanism can serve to restrain the heating roller and the pressure roller from conveying the multilayer film uselessly.

Although the touch panel TP is taken as an example of the operating unit, the operating unit may be a push button (switch) or the like which can be operated by a user and movable to a depressed position and a release position.

Although the controller 300 described above is configured to execute the processes in several modes based upon a signal received from the operating unit, the controller may be configured otherwise; for example, if the image forming apparatus and the layer transfer device are configured as an integral unit, the controller may be configured to determine the sizes and positions of the toner areas in the sheet(s) based on image data included in the print-and-transfer instruction, to choose an appropriate mode based on the sizes and positions of the toner areas.

Although the optical sensor is taken as an example of a state detection sensor, the state detection sensor may be configured as a unit including a lever interlocked with the switching mechanism and an optical sensor for detecting the position of the lever.

Although the sheet detection sensor is configured as a unit including a lever and an optical sensor for detecting the position of the lever, the sheet detection sensor may alternatively be made up of an optical sensor only.

To stop the conveyance of the multilayer film F, the relationship between the loading torque and driving torque may be set to LT>DT, as described above. However, the torques may be set to LT≥DT, instead.

The torque changer described above is configured to include the reel clutch C2 and the supply side torque limiter TL2 for changing a loading torque LT imposed to the supply reel 31, but the torque changer may alternatively be configured to change the magnitude of the driving torque. For example, a dedicated motor for driving the take-up reel may be provided in addition to the main motor, and the dedicated motor may be configured as the torque changer. In this alternative configuration, the relationship between the loading torque LT and the driving torque DT can be switched to LT<DT and to LT=DT by switching the dedicated motor on and off.

Furthermore, the torque changer may be a member movable between an engageable position in which it is engaged with the supply reel 31 to stop rotation of the supply reel 31 and a retreated position in which it is disengaged from the supply reel 31 to allow the supply reel 31 to rotate. In other words, the torque changer may be a mechanical lock mechanism capable of locking and releasing the rotation of the supply reel.

Instead of the roller clutch C5 and the pickup clutch C1, a dedicated motor for rotating the pressure roller 51 and a dedicated motor for rotating the pickup roller 11A may be provided.

Although the roller clutch C5 described above is taken as an example of a transmission switching mechanism, the transmission switching mechanism may be configured otherwise; for example, a pendulum (swing) gear configured to be swingable between a engaged position in which it is engaged with a predetermined gear of a transmission mechanism for transmitting a driving force to the pressure roller or the heating roller, and a disengaged position in which it is disengaged from the predetermined gear.

The transfer layer F22 including a foil is taken as an example above, but a transfer layer may be made of a thermoplastic resin not including foil or colorant, for example.

The multilayer film F described above has a four-layer structure as an example, but the multilayer film may have any number of layers as long as it includes a transfer layer and a supporting layer.

The elements described in the above embodiment and modified examples may be implemented selectively and in combination.

What is claimed is:

1. A layer transfer device for transferring a transfer layer onto an image formed on a sheet, the layer transfer device comprising:
   a supply reel on which a multilayer film including a transfer layer and a supporting layer supporting the transfer layer is wound;
   a take-up reel on which to take up the multilayer film;
   a driving source configured to generate mechanical power to drive the take-up reel;
   a releasable restraining device capable of switching to a restraining state in which the multilayer film is put under restraint in being drawn out from the supply reel and to a release state in which the restraint is lifted;
   a heating roller configured to heat the multilayer film and the sheet;
   a pressure roller configured to be rotatable to convey the multilayer film and the sheet nipped between the pressure roller and the heating roller; and
   a controller configured such that when the driving source is generating the mechanical power,
      the releasable restraining device is in the restraining state if an image area in which the image is formed on the sheet is not present in a layer transfer position between the heating roller and the pressure roller, and
      the releasable restraining device is in the release state if the image area is present in the layer transfer position.

2. The layer transfer device according to claim 1, wherein the controller is configured to ensure that the releasable restraining device is in the restraining state when the controller causes the driving source to generate the mechanical power in response to an instruction to transfer the transfer layer.

3. The layer transfer device according to claim 2, further comprising an upstream conveyor member located upstream of the heating roller in a direction of conveyance of the sheet,
   wherein the controller is configured to execute a restraint release process to cause the releasable restraining device to switch to the release state, within a period of time after a leading edge of the sheet goes past the upstream conveyor member before the image area reaches the layer transfer position.

4. The layer transfer device according to claim 3, wherein the controller is configured to execute the restraint release process after the leading edge of the sheet goes past the layer transfer position, if a distance from the image area to a trailing edge of the sheet is shorter than a distance from the image area to the leading edge of the sheet.

5. The layer transfer device according to claim 4, further comprising an operating unit capable of outputting to the controller a rearward area transfer instruction to transfer the transfer layer onto an image area of which a distance from the trailing edge of the sheet is shorter than a distance from the leading edge of the sheet,
   wherein the controller is configured to execute the restraint release process in response to the rearward area transfer instruction.

6. The layer transfer device according to claim 2, further comprising a downstream conveyor member located downstream of the heating roller in the direction of conveyance of the sheet,
   wherein the controller is configured to execute a post-transfer restraining process to cause the releasable restraining device to switch to the restraining state within a period of time after the image area goes past the layer transfer position before a trailing edge of the sheet reaches the downstream conveyor member.

7. The layer transfer device according to claim 6, wherein the controller is configured to execute the post-transfer restraining process before the trailing edge of the sheet reaches the layer transfer position, if a distance from the image area to a leading edge of the sheet is shorter than a distance from the image area to the trailing edge of the sheet.

8. The layer transfer device according to claim 7, further comprising an operating unit capable of outputting to the controller a forward area transfer instruction to transfer the transfer layer onto an image area of which a distance to the leading edge of the sheet is shorter than a distance to the trailing edge of the sheet,
   wherein the controller is configured to execute the post-transfer restraining process in response to the forward area transfer instruction.

9. The layer transfer device according to claim 7, further comprising a sheet detection sensor located upstream of the heating roller in the direction of conveyance of the sheet and configured to be capable of detecting the leading edge of the sheet going past the sheet detection sensor,
   wherein the controller is configured to start the post-transfer restraining process based on a time of detection of the leading edge of the sheet by the sheet detection sensor, if the distance from the image area to the leading edge of the sheet is shorter than the distance from the image area to the trailing edge of the sheet.

10. The layer transfer device according to claim 6, further comprising a sheet detection sensor located upstream of the heating roller in the direction of conveyance of the sheet and configured to be capable of detecting the trailing edge of the sheet going past the sheet detection sensor,
wherein the controller is configured to start the post-transfer restraining process based on a time of detection of the trailing edge of the sheet by the sheet detection sensor, if the image area is located on a rear side of the sheet.

11. The layer transfer device according to claim 6, further comprising a separator roller located downstream of the heating roller in the direction of conveyance of the sheet and configured to guide the multilayer film in a direction away from the sheet,
wherein the controller is configured to start the post-transfer restraining process after the image area goes past the separator roller.

12. The layer transfer device according to claim 6, wherein the controller is configured to stop the driving source after the post-transfer restraining process.

13. The layer transfer device according to claim 6, wherein the releasable restraining device comprises a switching mechanism configured to switch a state of the heating roller and the pressure roller to a nip state in which a nip pressure between the heating roller and the pressure roller is set at a predetermined value and to a nip release state in which the nip pressure is less than the predetermined value, and
wherein the controller is configured to:
cause the releasable restraining device to switch to the restraining state by causing the switching mechanism to switch the state of the heating roller and the pressure roller to the nip release state; and
cause the releasable restraining device to switch to the release state by causing the switching mechanism to switch the state of the heating roller and the pressure roller to the nip state.

14. The layer transfer device according to claim 13, wherein the switching mechanism is configured such that when the state of the heating roller and the pressure roller is in the nip release state, at least one of the heating roller and the pressure roller is located apart from the multilayer film.

15. The layer transfer device according to claim 14, wherein the releasable restraining device comprises a transmission switching mechanism configured to switch a state of transmission of the mechanical power generated by the driving source to a transmitting state in which the mechanical power is transmitted to the pressure roller or the heating roller and to a shut-off state in which transmission of the mechanical power to the pressure roller or the heating roller is shut off,
wherein the controller is configured to:
cause the releasable restraining device to switch to the restraining state by causing the transmission switching mechanism to switch the state of transmission to the shut-off state; and
cause the releasable restraining device to switch to the release state by causing the transmission switching mechanism to switch the state of transmission to the transmitting state.

16. The layer transfer device according to claim 15, wherein the controller is configured to cause the transmission switching mechanism to switch the state of transmission from the shut-off state to the transmitting state, within a period of time after the heating roller and the pressure roller start nipping the multilayer film before a leading edge of the sheet reaches the layer transfer position.

17. The layer transfer device according to claim 15, wherein the controller is configured such that, if a distance from the image area to the trailing edge of the sheet is shorter than a distance from the image area to a leading edge of the sheet, the switching mechanism starts switching the state of the heating roller and the pressure roller from the nip release state to the nip state after the leading edge of the sheet goes past the layer transfer position, and the transmission switching mechanism switches the state of transmission from the shut-off state to the transmitting state before the heating roller and the pressure roller start nipping the multilayer film and the sheet.

18. The layer transfer device according to claim 17, further comprising a state detection sensor configured to detect that the state of the heating roller and the pressure roller set by the switching mechanism is the nip release state,
wherein the controller is configured to cause the transmission switching mechanism to switch the state of transmission from the shut-off state to the transmitting state in response to a change in output of the state detection sensor.

19. The layer transfer device according to claim 15, wherein the controller is configured to cause the transmission switching mechanism to start switching the state of transmission from the transmitting state to the shut-off state after the trailing edge of the sheet goes past the layer transfer position before the switching mechanism finishes switching the state of the heating roller and the pressure roller to the nip release state.

20. The layer transfer device according to claim 15, wherein the controller is configured such that, if a distance from the image area to a leading edge of the sheet is shorter than a distance from the image area to the trailing edge of the sheet, the switching mechanism starts switching the state of the heating roller and the pressure roller from the nip state to the nip release state before the trailing edge of the sheet goes past the layer transfer position, and the transmission switching mechanism switches the state of transmission from the transmitting state to the shut-off state after the switching mechanism starts switching the state of the heating roller and the pressure roller from the nip state to the nip release state.

21. The layer transfer device according to claim 15, wherein the releasable restraining device comprises a torque changer configured to be capable of turning a balance between a loading torque exerted on the supply reel and a driving torque exerted on the take-up reel, and
wherein the controller is configured to:
cause the releasable restraining device to switch to the restraining state by causing the torque changer to establish a relationship such that the loading torque is greater than the driving torque; and
cause the releasable restraining device to switch to the release state by causing the torque changer to establish a relationship such that the loading torque is smaller than the driving torque.

22. The layer transfer device according to claim 21, wherein the torque changer comprises a load imposing device configured to impose a loading torque to the supply reel, and
wherein the controller is configured to:
cause the load imposing device to impose the loading torque to the supply reel to make the loading torque greater than the driving torque; and cause the load imposing device to stop imposing the loading torque to the supply reel to make the loading torque smaller than the driving torque.

23. The layer transfer device according to claim 21, wherein the controller is configured to:
cause the switching mechanism to start switching the state of the heating roller and the pressure roller from the nip state to the nip release state at a point in time after the image area goes past the layer transfer position before the trailing edge of the sheet reaches the layer transfer position, and
cause the torque changer to establish the relationship such that the loading torque is greater than the driving torque, within a period of time after the switching mechanism starts switching the state of the heating roller and the pressure roller from the nip state to the nip release state before the heating roller and the pressure roller come to assume the nip release state.

24. The layer transfer device according to claim 21, wherein the controller is configured such that, if a distance from the image area to the trailing edge of the sheet is shorter than a distance from the image area to a leading edge of the sheet:
the transmission switching mechanism is caused to switch the state of transmission from the shut-off state to the transmitting state, before the heating roller and the pressure roller start nipping the multilayer film and the sheet, and
the torque changer is caused to establish the relationship such that the loading torque is smaller than the driving torque, after the heating roller and the pressure roller nip the multilayer film and the sheet.

25. The layer transfer device according to claim 24, further comprising a state detection sensor configured to detect that the state of the heating roller and the pressure roller set by the switching mechanism is the nip release state, wherein the controller is configured to cause the torque changer to establish the relationship such that the loading torque is smaller than the driving torque, in response to a change in output of the state detection sensor.

26. The layer transfer device according to claim 21, wherein the controller is configured to:
cause the switching mechanism to start switching the state of the heating roller and the pressure roller from the nip state to the nip release state, after the trailing edge of the sheet goes past the layer transfer position, and
cause the torque changer to establish the relationship such that the loading torque is greater than the driving torque, before the switching mechanism causes the heating roller and the pressure roller to come to assume the nip release state.

27. The layer transfer device according to claim 1, wherein the releasable restraining device comprises a switching mechanism configured to switch a state of the heating roller and the pressure roller to a nip state in which the multilayer film is nipped between the heating roller and the pressure roller and to a nip release state in which at least one of the heating roller and the pressure roller is located apart from the multilayer film, and
wherein the controller is configured to:
cause the releasable restraining device to switch to the restraining state by causing the switching mechanism to switch the state of the heating roller and the pressure roller to the nip release state; and
cause the releasable restraining device to switch to the release state by causing the switching mechanism to switch the state of the heating roller and the pressure roller to the nip state,
wherein the controller is configured to be capable of implementing a normal mode and a layer-saving mode, and
wherein when the transfer layer is transferred onto an image formed on a sheet having a predetermined length in the direction of conveyance of the sheet and an image formable area defined within limits of the predetermined length, the controller in the normal mode executes a normal process in which a layer conveyance time for which the switching mechanism is keeping the heating roller and the pressure roller in the nip state is a first length in time longer than a period of time required to cause the image formable area in entirety of the sheet to go past the layer transfer position, while the controller in the layer-saving mode executes a layer-saving transfer process in which the layer conveyance time is a second length in time shorter than the first length in time.

28. The layer transfer device according to claim 27, further comprising an operating unit configured to offer an option between the normal mode and the layer-saving mode, wherein the controller is configured to implement either the normal mode or the layer-saving mode, based on a signal received from the operating unit.

29. The layer transfer device according to claim 27, wherein the layer-saving mode which the controller is configured to be capable of implementing comprises:
a forward area transfer mode, which is to be implemented by the controller if a distance from the image area to a leading edge of the sheet is shorter than a distance from the image area to the trailing edge of the sheet, and in which the switching mechanism is caused to keep the heating roller and the pressure roller in the nip state at least throughout a period of time for which the image area is going past the layer transfer position, and then the switching mechanism is caused to switch the state of the heating roller and the pressure roller to the nip release state before the trailing edge of the sheet goes past the layer transfer position; and
a rearward area transfer mode, which is to be implemented by the controller if a distance from the image area to a trailing edge of the sheet is shorter than a distance from the image area to the leading edge of the sheet, and in which the switching mechanism is caused to switch the state of the heating roller and the pressure roller to the nip state after the leading edge of the sheet goes past the layer transfer position, and the switching mechanism is caused to keep the heating roller and the pressure roller in the nip state at least throughout a period of time for which the image area is going past the layer transfer position.

30. The layer transfer device according to claim 29, further comprising:
an upstream conveyor member located upstream of the heating roller in the direction of conveyance of the sheet; and
a sheet detection sensor located upstream of the upstream conveyor member in the direction of conveyance of the sheet and configured to be capable of detecting the leading edge and the trailing edge of the sheet,
wherein the controller in the rearward area transfer mode is configured to:

determine a length of the sheet in the direction of conveyance of the sheet based on times of detection of the leading edge and the trailing edge of the sheet by the sheet detection sensor;

cause the switching mechanism to switch the state of the heating roller and the pressure roller to the nip state at a first nip point in time after the leading edge of the sheet goes past the layer transfer position, if the length of the sheet as determined is equal to or longer than a predetermined length; and cause the switching mechanism to switch the state of the heating roller and the pressure roller to the nip state at a second nip point in time earlier than the first nip point in time before the trailing edge of the sheet goes past the upstream conveyor member, if the length of the sheet as determined is shorter than the predetermined length.

31. The layer transfer device according to claim 29, further comprising:

a downstream conveyor member located downstream of the heating roller in the direction of conveyance of the sheet; and a sheet detection sensor located upstream of the heating roller in the direction of conveyance of the sheet and configured to be capable of detecting the leading edge and the trailing edge of the sheet, wherein the controller in the forward area transfer mode is configured to:

determine a length of the sheet in the direction of conveyance of the sheet based on times of detection of the leading edge and the trailing edge of the sheet by the sheet detection sensor;

cause the switching mechanism to switch the state of the heating roller and the pressure roller to the nip release state at a first nip-release point in time before the trailing edge of the sheet goes past the layer transfer position, if the length of the sheet as determined is equal to or longer than a predetermined length; and cause the switching mechanism to switch the state of the heating roller and the pressure roller to the nip release state at a second nip-release point in time later than the first nip-release point in time after the leading edge of the sheet goes past the downstream conveyor member, if the length of the sheet as determined is shorter than the predetermined length.

32. The layer transfer device according to claim 27, wherein the layer-saving transfer process executed by the controller in the layer-saving mode when a first image area having an image formed therein, a no-image area having no image formed therein, and a second image area having another image formed therein successively go past the layer transfer position in this sequence, comprises:

causing the switching mechanism to keep the heating roller and the pressure roller in the nip state at least throughout a period of time for which the first image area is going past the layer transfer position;

causing the switching mechanism to switch the state of the heating roller and the pressure roller to the nip release state after the first image area goes past the layer transfer position; and causing the switching mechanism to switch the state of the heating roller and the pressure roller to the nip state before the second image area reaches the layer transfer position and causing the switching mechanism to keep the heating roller and the pressure roller in the nip state at least throughout a period of time for which the second image area is going past the layer transfer position.

33. The layer transfer device according to claim 32, further comprising a separator roller located downstream of the heating roller in the direction of conveyance of the sheet and configured to guide the multilayer film in a direction away from the sheet, wherein the controller is configured to execute the layer-saving transfer process if a feasibility criterion as follows is satisfied:

$$X > V \times t + L$$

where X is a length of the no-image area in the direction of conveyance of the sheet;

V is a sheet conveyance velocity;

t is a shortest period of time required to cause the state of the heating roller and the pressure roller to be switched from the nip state to the nip release state and back to the nip state; and L is a distance from the layer transfer position to the separator roller.

34. The layer transfer device according to claim 33, wherein when a first sheet and a second sheet are conveyed successively in this sequence, the length X of the no-image area is computed by adding up a length X1 of a first no-image area adjacent to a trailing edge of the first sheet, a length X2 of a second no-image area adjacent to a leading edge of the second sheet, and a distance Y1 between the first sheet and the second sheet.

35. The layer transfer device according to claim 34, further comprising a sheet conveyor mechanism configured to convey the sheet, wherein the controller is configured to execute an adjustment process in which the sheet conveyor mechanism is controlled to make the distance Y1 between the first sheet and the second sheet longer or to make the sheet conveyance velocity V lower, if the feasibility criterion is not satisfied.

36. The layer transfer device according to claim 35, wherein the adjustment process executed by the controller comprises causing the sheet conveyor mechanism to start conveyance of the second sheet later if the feasibility criterion is not satisfied, than if the feasibility criterion is satisfied, to make the distance Y1 between the first sheet and the second sheet longer.

37. The layer transfer device according to claim 27, wherein the switching mechanism is configured to move the heating roller to switch the state of the heating roller and the pressure roller to the nip state and to the nip release state.

38. The layer transfer device according to claim 37, wherein the mechanical power generated by the driving source is transmitted to the pressure roller.

* * * * *